United States Patent
Urabayashi et al.

(10) Patent No.: US 10,172,054 B2
(45) Date of Patent: Jan. 1, 2019

(54) COMMUNICATION CONTROL METHOD AND USER TERMINAL

(71) Applicant: KYOCERA CORPORATION, Kyoto (JP)

(72) Inventors: Hiroyuki Urabayashi, Yokohama (JP); Noriyoshi Fukuta, Inagi (JP); Kugo Morita, Yokohama (JP); Naohisa Matsumoto, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 110 days.

(21) Appl. No.: 15/125,353

(22) PCT Filed: Mar. 20, 2015

(86) PCT No.: PCT/JP2015/058580
§ 371 (c)(1),
(2) Date: Sep. 12, 2016

(87) PCT Pub. No.: WO2015/141842
PCT Pub. Date: Sep. 24, 2015

(65) Prior Publication Data
US 2017/0094569 A1    Mar. 30, 2017

(30) Foreign Application Priority Data
Mar. 20, 2014  (JP) .................. 2014-057929

(51) Int. Cl.
*H04W 4/06*    (2009.01)
*H04W 48/10*    (2009.01)
(Continued)

(52) U.S. Cl.
CPC ............. *H04W 36/08* (2013.01); *H04W 4/06* (2013.01); *H04W 36/00* (2013.01); *H04W 48/10* (2013.01);
(Continued)

(58) Field of Classification Search
None
See application file for complete search history.

(56) References Cited

U.S. PATENT DOCUMENTS

2011/0170472 A1* 7/2011 Noh ............... H04L 5/0007
  370/312
2012/0281576 A1* 11/2012 Yamada ........... H04L 1/0046
  370/252
(Continued)

FOREIGN PATENT DOCUMENTS

WO    2013/140533 A1    9/2013

OTHER PUBLICATIONS

International Search Report issued in PCT/JP2015/058580; dated Jun. 23, 2015.
Written Opinion issued in PCT/JP2015/058580; dated Jun. 23, 2015.
3rd Generation Partnership Project; Technical Specification Group Radio Access Network; Evolved Universal Terrestrial Radio Access (E-UTRA); Radio Resource Control (RRC); Protocol specification; 3GPP TS 36.331 V12.0.0; Dec. 2013; pp. 1-349; Release 12; 3GPP Organizational Partners.
(Continued)

*Primary Examiner* — Duc T Duong
(74) *Attorney, Agent, or Firm* — Studebaker & Brackett PC

(57) ABSTRACT

A communication control method in a mobile communication system, wherein each of a plurality of cell sets a CSS that is applied in common to all UEs 100 within the corresponding cell, and information associated with system information (an SIB 13) that is necessary for the reception of the MBMS control information is arranged in the CSS. The communication control method includes a step of simultaneously performing, by a UE 100, communication with a first cell operating as a main cell in which blind decoding for the CSS is required, and communication with a second cell operating as a subordinate cell other than the main cell; and a step of transmitting, by the UE 100, to the first cell, a main cell change request for changing the main cell from the first cell to the second cell.

5 Claims, 19 Drawing Sheets

(51) Int. Cl.
  *H04W 84/02* (2009.01)
  *H04W 36/08* (2009.01)
  *H04W 36/00* (2009.01)
  *H04W 48/16* (2009.01)
  *H04L 5/00* (2006.01)
  *H04L 12/18* (2006.01)

(52) U.S. Cl.
  CPC ........... *H04W 48/16* (2013.01); *H04L 5/0001* (2013.01); *H04L 5/0053* (2013.01); *H04L 12/189* (2013.01)

(56) References Cited

U.S. PATENT DOCUMENTS

| | | | | |
|---|---|---|---|---|
| 2014/0050139 A1* | 2/2014 | Piggin | ................. | H04W 72/005 370/312 |
| 2015/0146604 A1* | 5/2015 | Kim | ................. | H04W 4/06 370/312 |
| 2016/0007319 A1* | 1/2016 | He | ................. | H04W 36/14 370/280 |
| 2017/0325176 A1* | 11/2017 | Hwang | ................. | H04W 76/025 |

OTHER PUBLICATIONS

Ericsson; eMBMS on Scell; 3GPP TSG RAN WG1 Meeting #75; R1-135773; Nov. 11-15, 2013; pp. 1-7; San Francisco, USA.

MediaTek; MBMS reception in CA; 3GPP TSG-RAN WG2 Meeting #71; R2-104432; Aug. 23-27, 2010; pp. 1-4; Madrid, Spain.

CMCC; Mobility scenarios and prioritizations for dual-connectivity; 3GPP TSG-RAN WG3 Meeting #83; R3-140077; Feb. 10-14, 2014; pp. 1-3; Prague, Czech Republic.

Samsung; Introduction of Dual Connectivity; 3GPP TSG-RAN WG2 #85; R2-141470; Feb. 10-14, 2014; pp. 1-3; Prague, Czech Republic.

Samsung; Discussion on MCH support on NCT; 3GPP TSG-RAN WG1#73 meeting; R1-131959; May 20-24, 2013; pp. 1-2; Fukuoka, Japan.

Ericsson, ST-Ericsson; MBMS UE capability extensions; 3GPP TSG-RAN WG2 #78; R2-122702; May 21-25, 2012; pp. 1-3; Prague, Czech Republic.

Nokia Siemens Networks, Nokia Corporation; UE capability and MBMS; 3GPP TSG-RAN WG2 Meeting #75bis; R2-114994; Oct. 10-14, 2011; pp. 1-3; Zhuhai, China.

* cited by examiner

FIG. 17

```
-- ASN1START

SystemInformationBlockType13-r14 ::=    SEQUENCE { mbsfn-AreaInfoList-r9               MBSFN-AreaInfoList-r9, notificationConfig-r9               MBMS-NotificationConfig-r9,      E1 mbsfn-AreaInfoListSCellList-r14         MBSFN-AreaInfoList-r14, notificationConfigSCellList-r14         MBMS-NotificationConfig-r14, lateNonCriticalExtension            OCTET STRING                     OPTIONAL,
Need OP

...

}

-- ASN1STOP
```

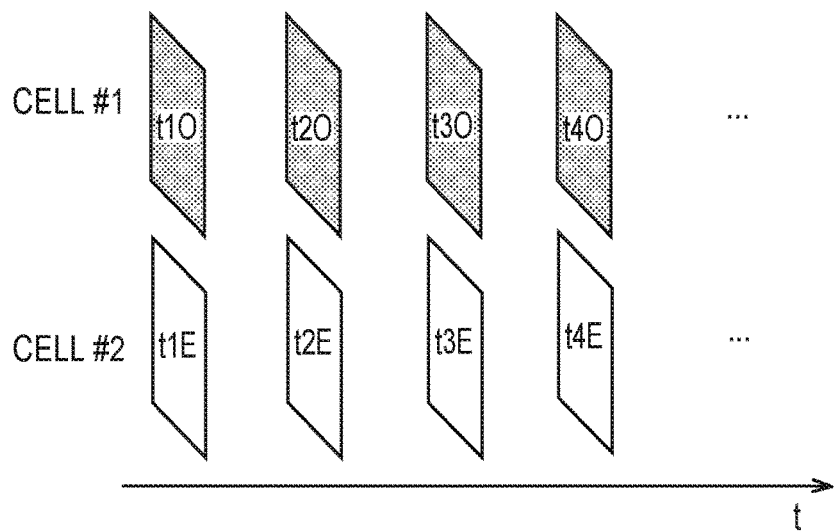
FIG. 21A
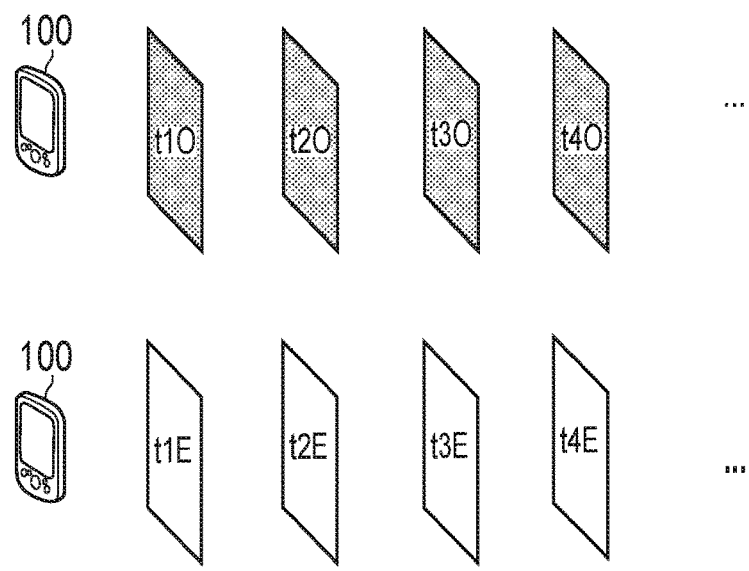
FIG. 21B
FIG. 21C
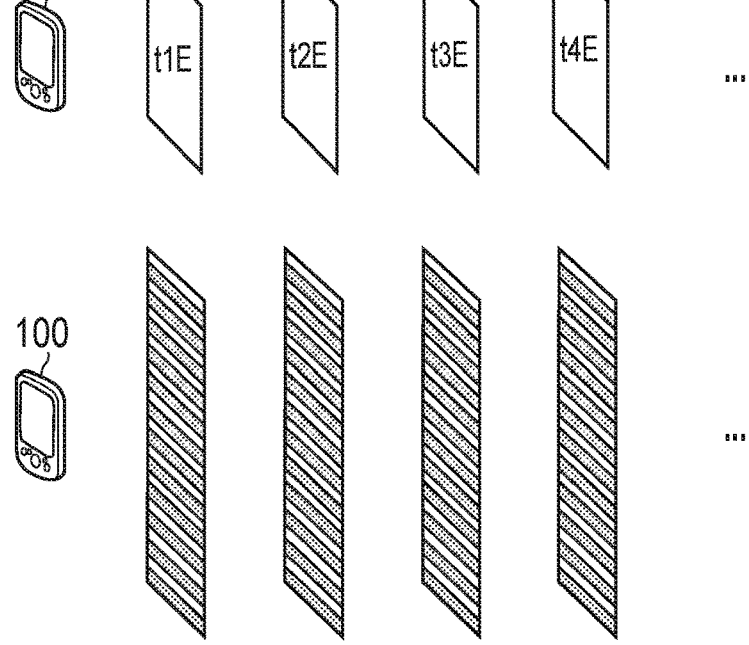
FIG. 21D

FIG. 24

```
SystemInformationBlockType15-r11 ::= SEQUENCE {
  mbms-SAI-IntraFreq-r11        MBMS-SAI-List-r11
  mbms-SAI-InterFreqList-r11    MBMS-SAIInterFreqList-r11
  lateNonCriticalExtension      OCTET STRING
  ....
  [[  mbms-SAI-InterFreqList-v1140   MBMS-SAI-InterFreqList-v1140
  ]]
}
MBMS-SAIInterFreqList-r11 ::= SEQUENCE ( SIZE ( 1..maxFreq)) OF MBMS-SAI-InterFreq-r11
MBMS-SAI-InterFreq-r11 ::= SEQUENCE {
  dl-CarrierFreq-r11            ARFCN-ValueEUTRA-r9,
  mbms-SAI-List-r11             MBMS-SAI-List-r11,
  mbms-SAI-Pair-List            MBMS-SAI-PAIR-LIST   ←A LIST OF PAIR INFORMATION
}
MBMS-SAI-PAIR-LIST ::= SEQUENCE (SIZE ( 1..maxSAI-MBMS-r11 ))OF MBMS-SAI-PAIR
MBMS-SAI-PAIR ::= SEQUENCE {
  mbms-SAI-Inter-r11            MBMS-SAI-r11,    ←SAI OF InterFreq FORMING A PAIR
  mbms-SAI-Intra-r11            MBMS-SAI-r11,    ←SAI OF IntraFreq FORMING A PAIR
  mbms-Pair-Inter-Type          ENUMERATED {     ←RELATIONSHIP WITH INTER
                                    odd_frame,   ←ODD-NUMBERED FRAME (1)
                                    eve_frame,   ←EVEN-NUMBERED FRAME (1)
                                    odd_line,    ←ODD-NUMBERED LINE (2-1)
                                    even_line,   ←EVEN-NUMBERED LINE (2-1)

odd_pixel,   ←ODD-NUMBERED PIXEL (2-2)
                                    eve_pixel,   ←EVEN-NUMBERED PIXEL (2-2)
                                    right_eye,   ←RIGHT-EYE IMAGE (3)
                                    left_eye     ←LEFT-EYE IMAGE (3)
                                }
}
```

E2

COMMUNICATION CONTROL METHOD AND USER TERMINAL

TECHNICAL FIELD

The present invention relates to a communication control method used in a mobile communication system.

BACKGROUND ART

In 3GPP (3rd Generation Partnership Project), which is a project aiming to standardize a mobile communication system, the specifications of MBMS (Multimedia Broadcast Multicast Service) have been laid down. In the MBMS, a user terminal receives MBMS control information and MBMS data transmitted from a cell. Here, the MBMS control information is information transmitted on an MCCH (Multicast Control Channel), and is control information that is necessary for the reception of the MBMS data.

The user terminal receives the MBMS control information according to the procedure described below. Firstly, the user terminal performs blind decoding for the common search space that is set by a cell. The common search space is provided in the control region of a downlink subframe, and is applied in common to all the user terminals within the cell. The common search space includes information associated with system information that is necessary for the reception of the MBMS control information. Further, the user terminal receives the system information that is transmitted from the cell on the basis of the information included in the common search space. Thus, the user terminal receives the MBMS control information that is transmitted from the cell on the basis of the system information.

On the other hand, the specifications of carrier aggregation have been laid down in 3GPP. In carrier aggregation, the user terminal simultaneously performs communication with a primary cell and communication with a secondary cell. The primary cell is a cell that performs mobility control of the user terminal, and in which blind decoding for the common search space is required. In Release 12, when a user terminal either receives or has an interest in receiving the MBMS data that is transmitted from a secondary cell, the user terminal is capable of performing the process for acquiring the system information of the secondary cell (system information acquisition) (see Non Patent Document 1).

PRIOR ART DOCUMENT

Non Patent Literature

Non Patent Document 1: 3GPP Technical Specification "TS 36.331 V12.0.0" December, 2013

SUMMARY

A communication control method according to one embodiment, comprises simultaneously performing, by a user terminal, communication with a first cell operating as a main cell, and communication with a second cell operating as a subordinate cell other than the main cell; and transmitting, by the user terminal, to the first cell, a main cell change request for changing the main cell from the first cell to the second cell. In the main cell, blind decoding for a common search space is required. The common search space is set by each of a plurality of cells so that the common search space is applied in common to all user terminals within the corresponding cell. Information associated with system information that is necessary for reception of multicast/broadcast control information is arranged in the common search space.

A communication control method according to one embodiment comprises: simultaneously performing, by a user terminal, communication with a first cell operating as a main cell, and communication with a second cell operating as a subordinate cell other than the main cell; and transmitting, by the first cell, to the user terminal, through system information, first information that is necessary for reception of multicast/broadcast control information from the first cell; and transmitting, by the first cell, to the user terminal, second information that is necessary for reception of multicast/broadcast control information from the second cell. In the main cell, blind decoding for a common search space is required. The common search space is set by each of a plurality of cells so that the common search space is applied in common to all user terminals within the corresponding cell. Information associated with the system information that is necessary for reception of multicast/broadcast control information is arranged in the common search space.

A communication control method according to one embodiment comprises: arranging, by a first cell, information indicating a resource location of a first radio resource for transmitting first multicast/broadcast data in the first cell, in a common search space of the first cell; and arranging, by a second cell, information indicating a resource location of a second radio resource for transmitting second multicast/broadcast data in the second cell, in a common search space of the second cell. The common search space is set by each of a plurality of cells so that the common search space is applied in common to all user terminals within the corresponding cell. The first radio resource and the second radio resource are set in the same resource location.

BRIEF DESCRIPTION OF THE DRAWINGS

FIG. 17 is a diagram showing system information (an SIB 13) in the operation pattern 1 according to the second embodiment.

FIGS. 21A to 21D are diagrams showing a configuration method 2 of the first MBMS data and the second MBMS data according to the third embodiment.

FIG. 24 is a diagram showing a notification method of an association between a cell #1 and a cell #2 according to the third embodiment.

DESCRIPTION OF THE EMBODIMENTS

Overview of Embodiments

Figure 1:
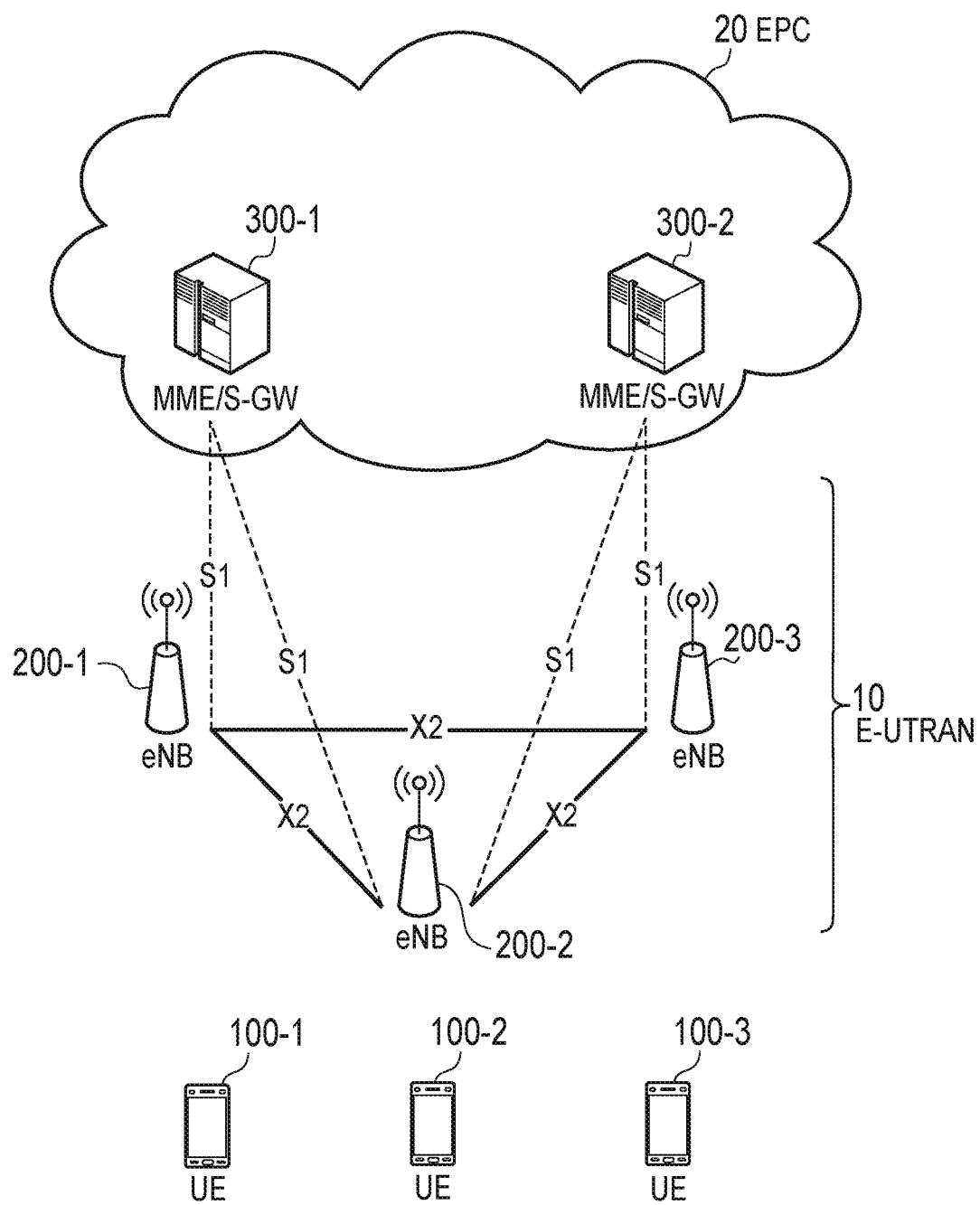
FIG. 1 is a configuration diagram of an LTE system according to a first embodiment to a third embodiment.

A communication control method according to a first embodiment comprises: simultaneously performing, by a user terminal, communication with a first cell operating as a main cell, and communication with a second cell operating as a subordinate cell other than the main cell; and transmitting, by the user terminal, to the first cell, a main cell change request for changing the main cell from the first cell to the second cell. In the main cell, blind decoding for a common search space is required. The common search space is set by each of a plurality of cells so that the common search space is applied in common to all user terminals within the corresponding cell. Information associated with system information that is necessary for reception of multicast/broadcast control information is arranged in the common search space.

In the first embodiment, the communication control method further comprises performing, by the user terminal after changing the main cell to the second cell, blind decoding for the common search space that is set by the second cell; and receiving, by the user terminal, the system information from the second cell on the basis of a result of the blind decoding.

In the first embodiment, the first cell and the second cell belong to different MBSFN areas, respectively. When the user terminal has an interest in receiving multicast/broadcast data that is transmitted by multicast from the second cell, the user terminal transmits the main cell change request to the first cell.

In the first embodiment, the user terminal simultaneously performs communication with the first cell and communication with the second cell through carrier aggregation. The main cell is a primary cell that is managed by a base station. The subordinate cell is a secondary cell that is managed by the base station.

In a modification of the first embodiment, the user terminal simultaneously performs communication with the first cell and communication with the second cell through a dual connectivity scheme. The main cell is a primary cell included in a master cell group that is managed by a base station. The subordinate cell is a cell that is managed by a base station other than the base station.

A user terminal according to the first embodiment comprises: a controller configured to simultaneously perform communication with a first cell operating as a main cell, and communication with a second cell operating as a subordinate cell other than the main cell; and a transmitter configured to transmit, to the first cell, a main cell change request for changing the main cell from the first cell to the second cell. In the main cell, blind decoding for a common search space is required. The common search space is set by each of a plurality of cells so that the common search space is applied in common to all user terminals within the corresponding cell. Information associated with system information that is necessary for reception of multicast/broadcast control information is arranged in the common search space.

A communication control method according to a second embodiment comprises: simultaneously performing, by a user terminal, communication with a first cell operating as a main cell, and communication with a second cell operating as a subordinate cell other than the main cell; and transmitting, by the first cell, to the user terminal, through system information, first information that is necessary for reception of multicast/broadcast control information from the first cell; and transmitting, by the first cell, to the user terminal, second information that is necessary for reception of multicast/broadcast control information from the second cell. In the main cell, blind decoding for a common search space is required. The common search space is set by each of a plurality of cells so that the common search space is applied in common to all user terminals within the corresponding cell. Information associated with the system information that is necessary for reception of multicast/broadcast control information is arranged in the common search space.

In an operation pattern 1 of the second embodiment, the first cell broadcasts the second information to the user terminal through the system information.

In an operation pattern 2 of the second embodiment, the first cell unicasts the second information to the user terminal through individual signaling that is different from the system information.

In the operation pattern 2 of the second embodiment, the user terminal transmits to the first cell, terminal capability information related to the capability of reception of multicast/broadcast delivered by the subordinate cell. The first cell unicasts the second information to the user terminal through the individual signaling on the basis of the terminal capability information.

In the operation pattern 2 of the second embodiment, the user terminal transmits to the first cell, a multicast/broadcast interest indication indicating that the user terminal has an interest in receiving multicast/broadcast data that is transmitted from the second cell. The first cell unicasts the second information to the user terminal through the individual signaling on the basis of the multicast/broadcast interest indication.

In the second embodiment, the user terminal simultaneously performs communication with the first cell and communication with the second cell through carrier aggregation. The main cell is a primary cell that is managed by a base station. The subordinate cell is a secondary cell that is managed by the base station.

In a modification of the second embodiment, the user terminal simultaneously performs communication with the first cell and communication with the second cell through a dual connectivity scheme. The main cell is a primary cell included in a master cell group that is managed by a base station. The subordinate cell is a cell that is managed by a base station other than the base station.

A user terminal according to the second embodiment comprises a controller configured to simultaneously perform communication with a first cell operating as a main cell, and communication with a second cell operating as a subordinate cell other than the main cell; and a receiver configured to receive, from the first cell, first information that is necessary for reception of multicast/broadcast control information from the first cell, through system information. The receiver receives, from the first cell, second information that is necessary for reception of multicast/broadcast control information from the second cell. In the main cell, blind decoding for a common search space is required. The common search space is set by each of a plurality of cells so that the common search space is applied in common to all user terminals within the corresponding cell. Information associated with the system information that is necessary for reception of multicast/broadcast control information is arranged in the common search space.

A communication control method according to a third embodiment comprises: arranging, by a first cell, information indicating a resource location of a first radio resource for transmitting first multicast/broadcast data in the first cell, in a common search space of the first cell; and arranging, by a second cell, information indicating a resource location of a second radio resource for transmitting second multicast/broadcast data in the second cell, in a common search space of the second cell. The common search space is set by each of a plurality of cells so that the common search space is applied in common to all user terminals within the corresponding cell. The first radio resource and the second radio resource are set in the same resource location.

In the third embodiment, the first multicast/broadcast data and the second multicast/broadcast data are generated on the basis of an identical information source.

In the third embodiment, a user terminal simultaneously performs communication with the first cell operating as a main cell, and communication with the second cell operating as a subordinate cell other than the main cell. The user terminal receives, on the basis of a result of blind decoding performed for a common search space of the first cell, from the first cell, the first multicast/broadcast data and also receives, from the second cell, the second multicast/broadcast data. In the main cell, blind decoding for a common search space is required.

In the third embodiment, the user terminal simultaneously performs communication with the first cell and communication with the second cell through carrier aggregation. The main cell is a primary cell that is managed by a base station. The subordinate cell is a secondary cell that is managed by the base station.

In a modification of the third embodiment, the user terminal simultaneously performs communication with the first cell and communication with the second cell through a dual connectivity scheme. The main cell is a primary cell included in a master cell group that is managed by a base station. The subordinate cell is a cell that is managed by a base station other than the base station.

In the third embodiment, a user terminal performs communication with the first cell. The user terminal receives, from the first cell, the first multicast/broadcast data, on the basis of a result of blind decoding performed for a common search space of the first cell.

In the third embodiment, the information source is video data. The first multicast/broadcast data is some video frames configuring the information source. The second multicast/broadcast data is the other video frames configuring the information source.

In the third embodiment, the information source is video data. The first multicast/broadcast data is some video portions in a video frame configuring the information source. The second multicast/broadcast data is the other video portions in the video frame configuring the information source.

A user terminal according to the third embodiment comprises: a controller configured to simultaneously perform communication with a first cell operating as a main cell, and communication with a second cell operating as a subordinate cell other than the main cell; and a receiver configured to receive, on the basis of a result of blind decoding performed for a common search space of the first cell, from the first cell, first multicast/broadcast data and also receive, from the second cell, second multicast/broadcast data. A first radio resource for transmitting the first multicast/broadcast data in the first cell, and a second radio resource for transmitting the second multicast/broadcast data in the second cell are set at the same resource location. In the main cell, blind decoding for the common search space is required. The common search space is set by each of a plurality of cells so that the common search space is applied in common to all user terminals within the corresponding cell.

First Embodiment

An embodiment of applying the present invention to a LTE system that is a mobile communication system based on the 3GPP standard will be described below.

(1) System Configuration

The system configuration of the LTE system according to the first embodiment will be described below. FIG. 1 is a configuration diagram of the LTE system according to the first embodiment.

As illustrated in FIG. 1, the LTE system according to the first embodiment includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer user. MME/S-GW 300 is connected to eNB 200 via an S1 interface. Further, a network of the LTE system is configured by the E-UTRAN 10 and the EPC 20.

Figure 2:
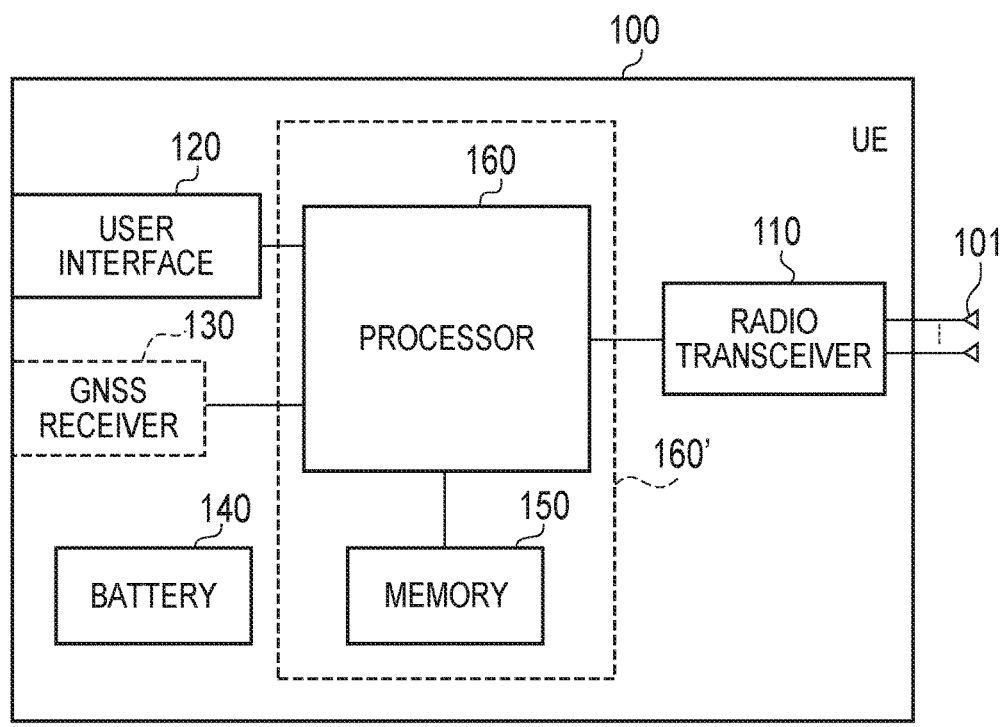
FIG. 2 is a block diagram of a UE according to the first embodiment to the third embodiment.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The processor 160 and the memory 150 constitute a controller. The UE 100 may not have the GNSS receiver 130. Furthermore, the memory 150 may be integrally formed with the processor 160, and this set (that is, a chip set) may be called a processor 160'.

The plural antennas 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
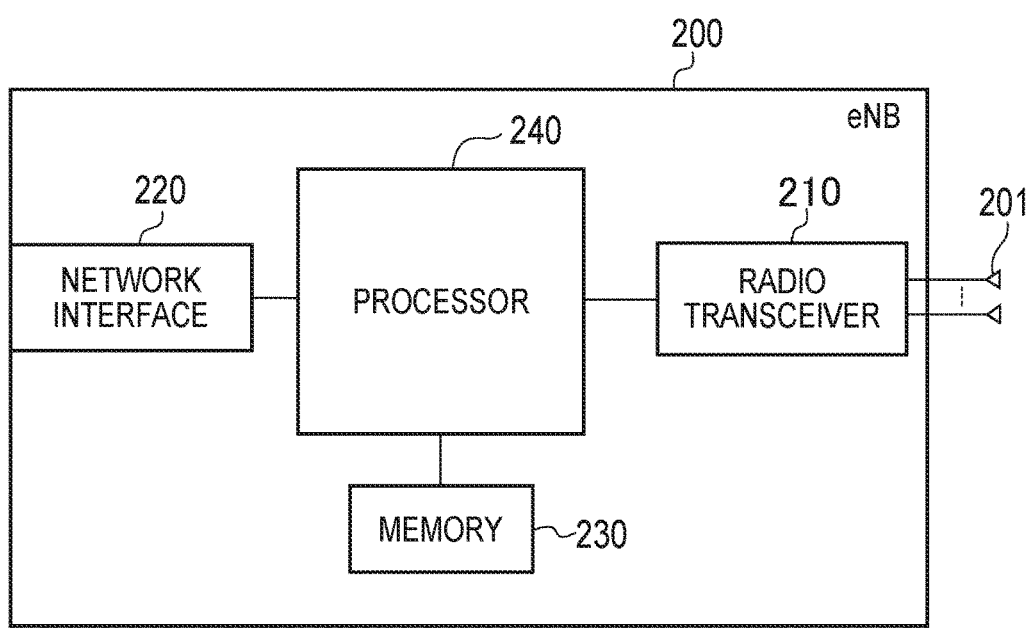
FIG. 3 is a block diagram of an eNB according to the first embodiment to the third embodiment.

FIG. 3 is a block diagram of the eNB 200. As illustrated in FIG. 3, the eNB 200 includes plural antennas 201, a radio transceiver 210, a network interface 220, a memory 230, and a processor 240. The processor 240 and the memory 230 constitute a controller. Further, the memory 230 may be integrally formed with the processor 240, and this set (that is, a chipset) may be called a processor.

The plural antennas 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
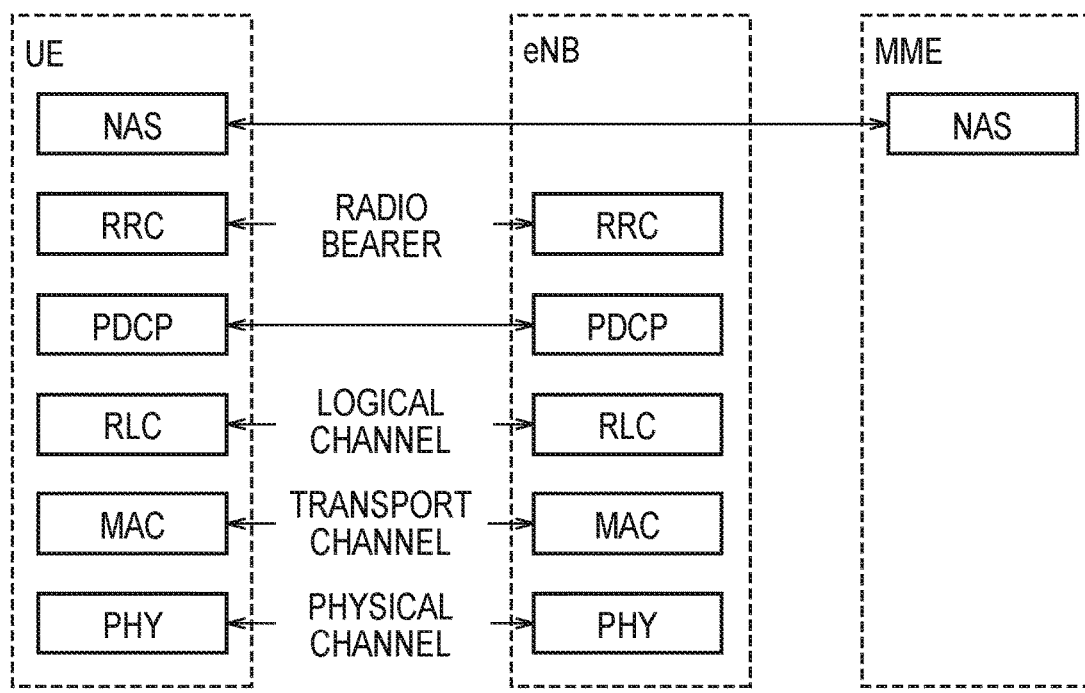
FIG. 4 is a protocol stack diagram of a radio interface according to the first embodiment to the third embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, use data and control information are transmitted via the physical channel.

The MAC layer performs priority control of data, a retransmission process by hybrid ARQ (HARQ), a random access procedure and the like. Between the MAC layer of the UE 100 and the MAC layer of the eNB 200, user data and control information are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control information are transmitted via a logical channel.

The PDCP layer performs header compression and decompression, and encryption and decryption.

The RRC layer is defined only in a control plane dealing with control information. Between the RRC layer of the UE 100 and the RRC layer of the eNB 200, control information (RRC messages) for various types of configuration are transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in an RRC connected state, otherwise the UE 100 is in an RRC idle state.

A NAS (Non-Access Stratum) layer positioned above the RRC layer performs a session management, a mobility management and the like.

Figure 5:
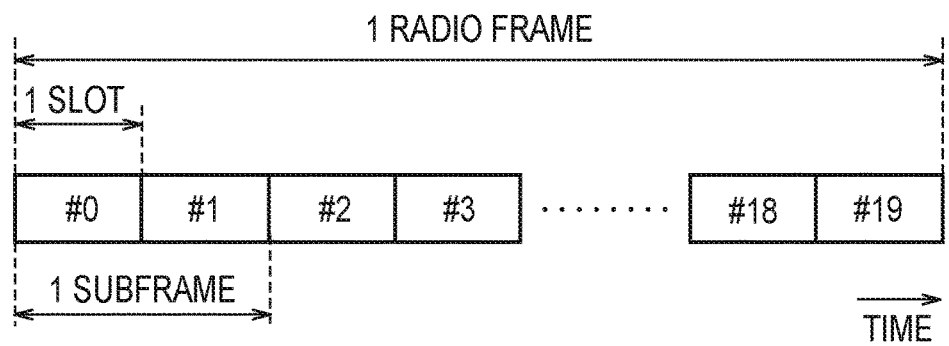
FIG. 5 is a configuration diagram of a radio frame according to the first embodiment to the third embodiment.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

Figure 6:
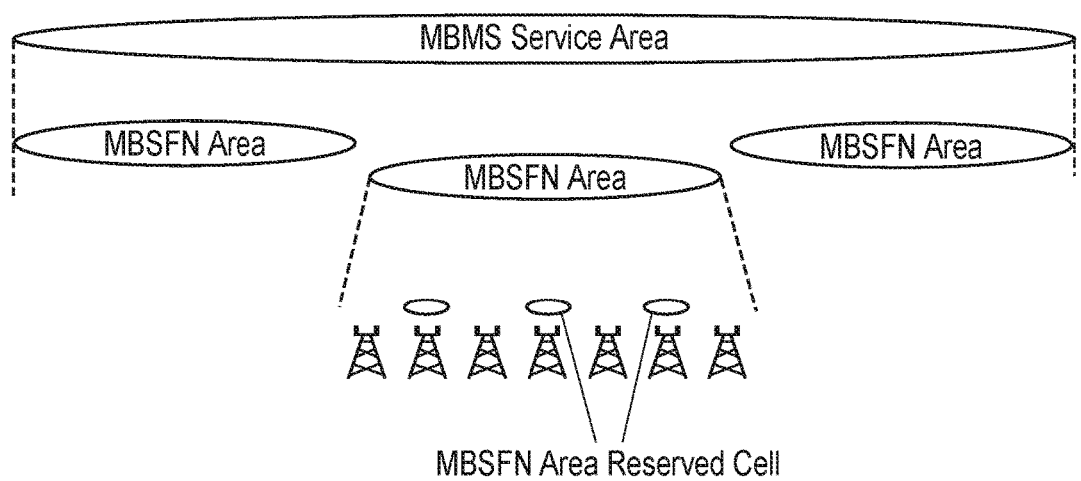
FIG. 6 is a diagram showing an area where MBMS is provided.

As illustrated in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. A resource element (RE) is configured by one subcarrier and one symbol. Furthermore, among radio resources (time-frequency resources) assigned to the UE 100, a frequency resource is specified by a resource block and a time resource is specified by a subframe (or slot).

In the downlink, an interval of several symbols at the head of each subframe is a control region used as a physical downlink control channel (PDCCH) for mainly transmitting control information. Furthermore, the other interval of each subframe is a data region available as a physical downlink shared channel (PDSCH) for mainly transmitting user data.

Through the PDCCH, the eNB 200 transmits, to the UE 100, information (L1/L2 control information) for notifying the resource assignment result of the downlink and the uplink. Each PDCCH occupies a resource configured by one or a plurality of continuing control channel elements (CCEs). One CCE is configured by a plurality of REs. The number of CCEs (aggregation levels) that a PDCCH occupies is set as any one of 1, 2, 4, and 8.

The eNB 200 transmits a plurality of control information. In order to identify the transmission-destination UE 100 of each control information, the eNB 200 includes the CRC bit scrambled by the identifier (the RNTI: Radio Network Temporary ID) of the transmission-destination UE 100.

By descrambling the CRC bit by the RNTI of the UE 100 for the plurality of control information that may be addressed to the UE 100, each UE 100 detects the control information addressed to the UE 100 through blind decoding for the PDCCH.

Further, in order to reduce the frequency of blind decoding, the CCEs that are the target of blind decoding are restricted. The CCE region that is the target of blind decoding is called the "search space".

(2) MBMS

An overview of MBMS will be described, below. The LTE system according to the first embodiment supports MBMS (Multimedia Broadcast Multicast Service). In the MBMS, the UE 100 receives multimedia contents (the MBMS data) that is delivered by multicast or broadcast from a network. The UE 100 is capable of receiving the MBMS data not only in the RRC connection state but also in the RRC idle state.

FIG. 6 is a diagram showing an area in which the MBMS is provided. As shown in FIG. 6, one MBSFN (Multicast-Broadcast Single-Frequency Network) area is configured by a plurality of cells, and an MBMS service area is configured by a plurality of MBSFN areas. One cell may belong to a plurality of MBSFN areas.

Figure 7:
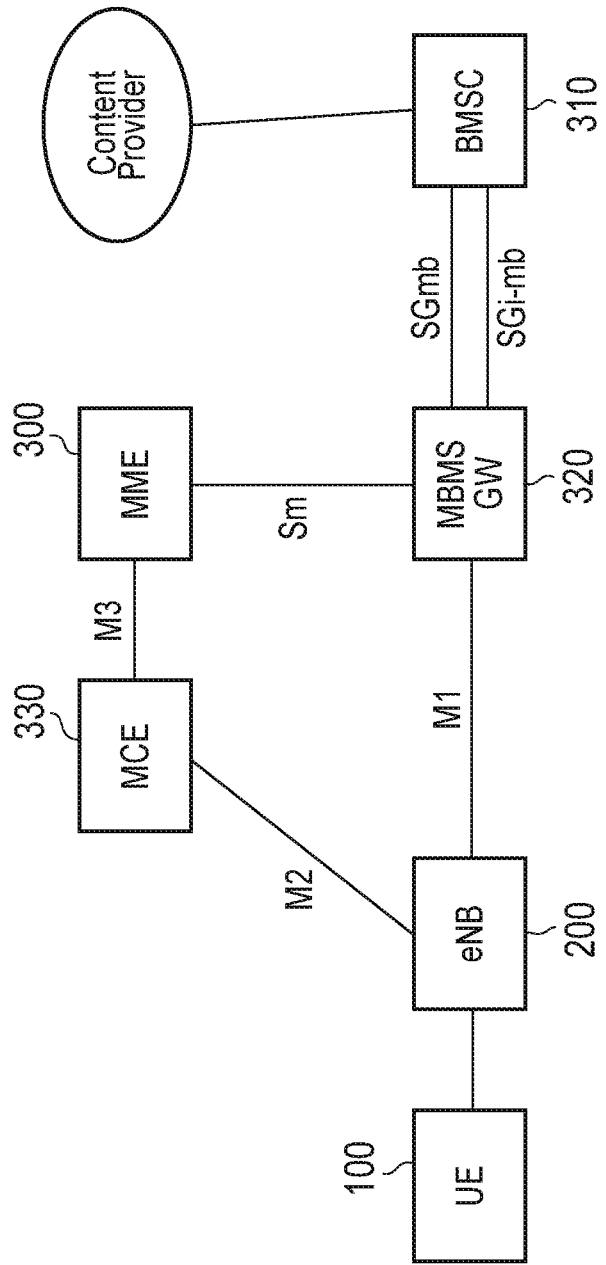
FIG. 7 is a diagram showing a network configuration related to the MBMS.

FIG. 7 is a diagram showing a network configuration related to the MBMS. As shown in FIG. 7, a BMSC (broadcast multicast service Center) 310 provides a function of distributing MBMS data. An MBMS GW (MBMS gateway) 320 broadcasts the MBMS data to each eNB 200. An MCE (Multi-cell Coordination Entity) 330 controls a radio resource used by each eNB 200 in the same MBSFN area or sets an MBSFN subframe, for example.

In the MBMS, the UE 100 receives MBMS control information in order to receive the MBMS data transmitted from a cell. The MBMS control information is information transmitted on an MCCH (Multicast Control Channel), and is control information that is necessary for the reception of the MBMS data.

The UE 100 receives the MBMS control information according to the procedure described below. Firstly, the UE 100 performs blind decoding for the common search space (the CSS) that is set by a cell. The CSS is provided in the control region of a downlink subframe, and is applied in common to all the UEs 100 within the cell. The CSS includes information (such as the resource assignment information, the MCS, etc.) associated with the system information (the SIB 13: System Information Block type 13) that is necessary for the reception of the MBMS control information.

The UE 100 receives the system information (the SIB 13) that is transmitted from the cell on the basis of the information included in the CSS. Thus, the UE 100 receives the MBMS control information that is transmitted from the cell on the basis of the system information (the SIB 13).

(3) Operation According to First Embodiment

An operation according to the first embodiment will be described, below. The first embodiment describes an operation related to MBMS reception during the application of carrier aggregation.

Figure 8:
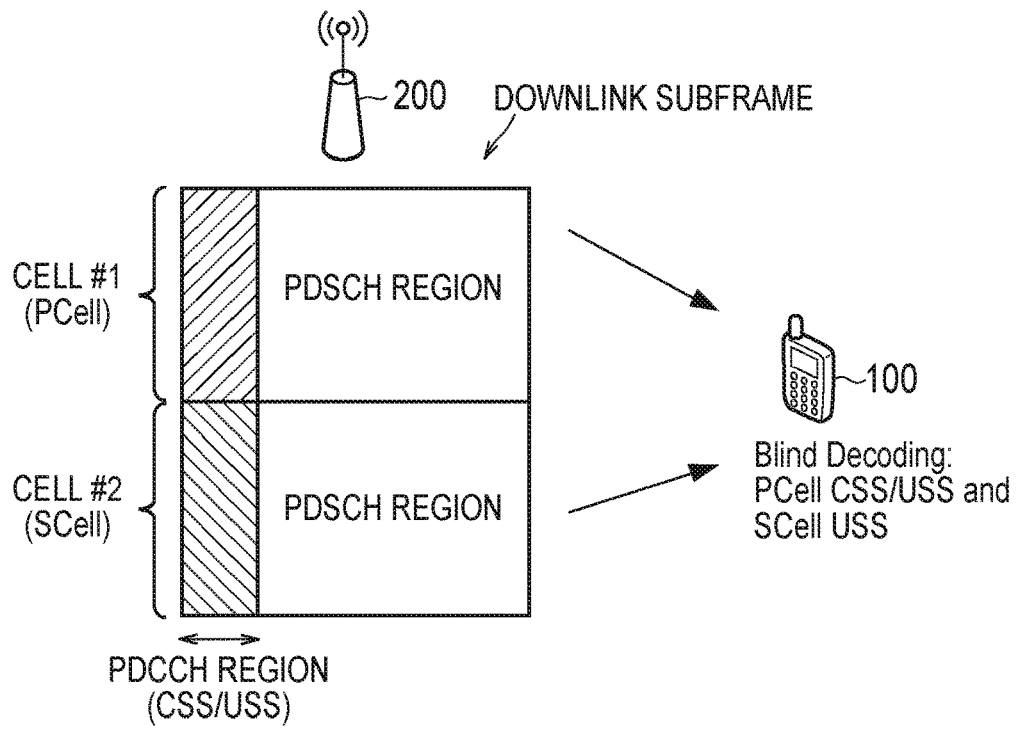
FIG. 8 is a diagram showing an operation environment according to the first embodiment.

FIG. 8 is a diagram showing an operation environment according to the first embodiment.

As shown in FIG. 8, the eNB 200 manages a cell #1 (a first cell) and a cell #2 (a second cell). The cell #1 and the cell #2 use different frequencies (component carriers).

In carrier aggregation, the UE 100 simultaneously performs communication with a plurality of cells managed by one eNB 200. In FIG. 8, the cell #1 is set as a primary cell (PCell), and the cell #2 is set as a secondary cell (SCell). In the first embodiment, the PCell corresponds to the main cell, and the SCell corresponds to a subordinate cell.

The downlink subframe of the cell #1 and the downlink subframe of the cell #2 include a control region (a PDCCH region), respectively. In addition to the CSS described above, the PDCCH region includes a specific search space (USS: UE specific Search Space) in which the control information specific to each UE within the cell is located.

In carrier aggregation, the UE 100 performs blind decoding for the USS of the SCell together with the blind decoding for both the CSS and the USS of the PCell. Since the UE 100 performs blind decoding for the CSS of the PCell, the UE 100 is capable of acquiring the system information of the PCell. On the other hand, the UEs 100 conforming to a release prior to Release 12 (however, Release 10 and later) do not perform blind decoding for the CSS of the SCell, and therefore, are not capable of acquiring the system information of the SCell.

Figure 9:
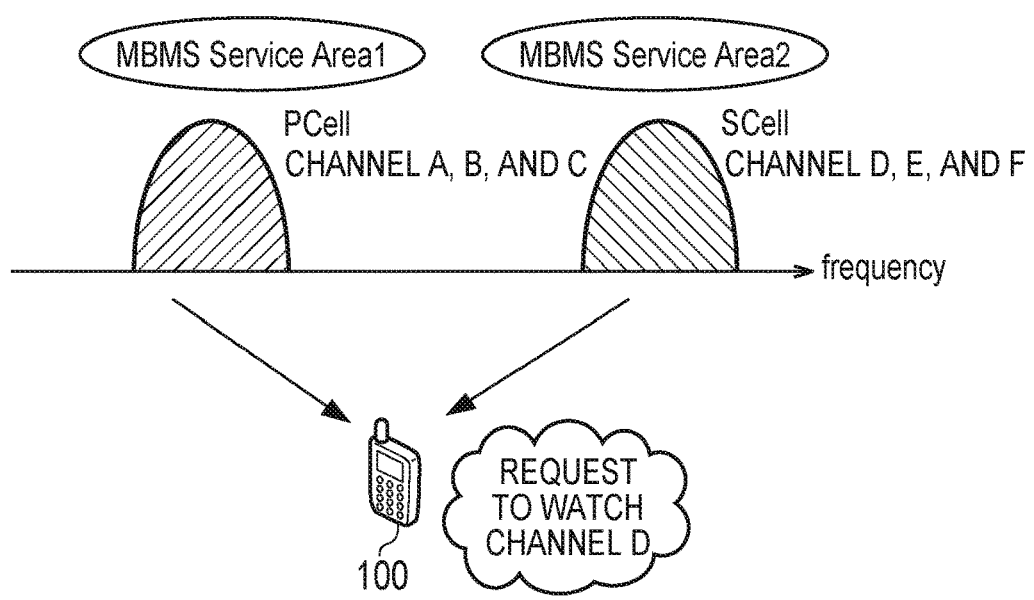
FIG. 9 is a diagram for describing a problem occurring in the operation environment shown in FIG. 8.

FIG. 9 is a diagram for describing a problem occurring in the operation environment shown in FIG. 8.

As shown in FIG. 9, the cell #1 (the PCell) belongs to an MBMS service area 1, and the cell #2 (the SCell) belongs to an MBMS service area 2. The MBMS service area 1 is an area that provides the MBMS data of channels A, B, and C. The MBMS service area 2 is an area that provides the MBMS data of channels D, E, and F.

The UE 100 understands that the cell #1 belongs to the MBMS service area 1, and the cell #2 belongs to the MBMS service area 2 through the system information (the SIB 15: System Information Block type 15) and the like acquired from the cell #1. Further, the UE 100 understands the information related to the channels provided by each MBMS service area through an NAS message.

Here, a case in which the UE 100 has an interest in the MBMS data of channel D is assumed. If a UE 100 that supports Release 12 has an interest in the MBMS data transmitted from the SCell, the UE 100 acquires the system information (the SIB 13) of the SCell, and is capable of receiving the MBMS control information and MBMS data from the SCell.

However, when the UE 100 acquires the system information (the SIB 13) of the SCell, the UE 100 is required to perform blind decoding for the CSS set by the SCell. Therefore, the UE 100 performs blind decoding for the CSS for the SCell and the PCell, respectively, which causes an increase in the process load of the UE 100 owing to blind decoding.

Therefore, in the first embodiment, the process load of the UE 100 owing to blind decoding is reduced by the method described below.

The communication control method according to the first embodiment includes a step A of simultaneously performing, by the UE 100, communication with a cell #1 operating as a PCell in which blind decoding for the CSS is required, and communication with a cell #2 operating as an SCell other than the PCell, and a step B of transmitting, by the UE 100, to the cell #1, a PCell change request for changing the PCell from the cell #1 to the cell #2.

Further, the communication control method according to the first embodiment includes a step C of performing, by the UE 100, blind decoding for the CSS that is set by the cell #2, after changing the PCell to the cell #2, and a step D of receiving, by the UE 100, system information (the SIB 13) from the cell #2 on the basis of the results of blind decoding performed in the step C.

As a result, the UE 100 can receive the MBMS control information transmitted by the cell #2. Further, since blind decoding for the CSS may be performed for only the cell #2, which has become the new PCell, the process load owing to blind decoding can be reduced to half as compared to the case when blind decoding is performed in parallel for two cells.

Figure 10:
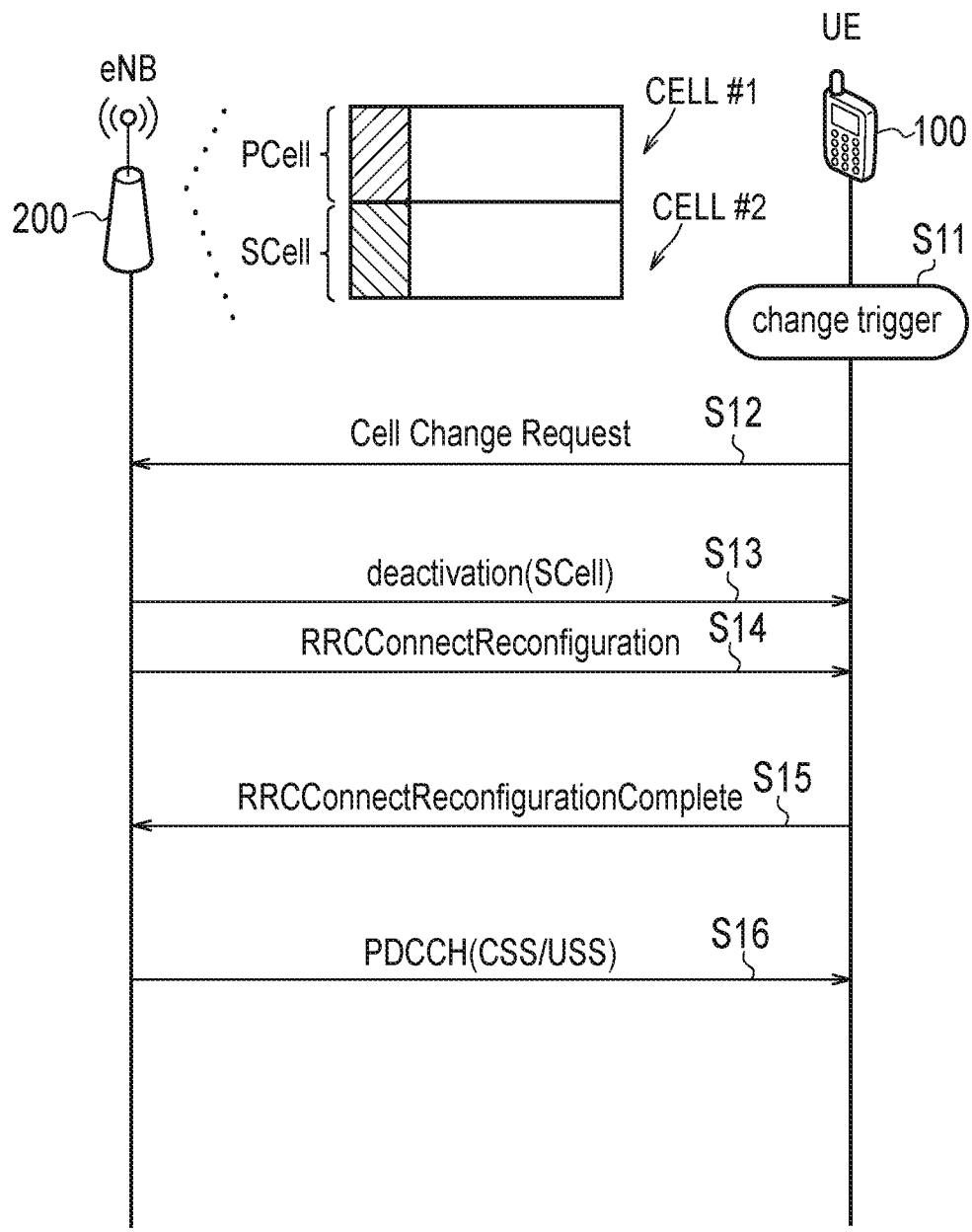
FIG. 10 is a sequence diagram showing an operation according to the first embodiment.

FIG. 10 is a sequence diagram showing an operation according to the first embodiment. In the initial state, the cell #1 is set as the PCell of the UE 100, and the cell #2 is set as the SCell of the UE 100.

As shown in FIG. 10, in step S11, the UE 100 determines that the PCell is to be changed from the cell #1 to the cell #2. For example, if the UE 100 has an interest in receiving the MBMS data that is transmitted from the cell #2 by multicast, the UE 100 determines that the PCell is to be changed from the cell #1 to the cell #2. Alternatively, if the UE 100 has an interest in receiving the MBMS data that is transmitted from the cell #2 by multicast, and does not have an interest in receiving the MBMS data that is transmitted from the cell #1 by multicast, the UE 100 determines that the PCell is to be changed from the cell #1 to the cell #2.

In step S12, the UE 100 transmits a PCell change request (a Cell Change Request) to the cell #1. The PCell change request includes the identifier of the new PCell (here, the identifier of the cell #2) that the UE 100 desires. The PCell change request may include frequency information indicating where the MBMS data of interest is delivered. The PCell change request may be included in an MBMS interest indication. Alternatively, the PCell change request may be a message that is different from the MBMS interest indication. In this case, it may be specified that the transmission of the PCell change request is allowed only after the transmission of the MBMS interest indication. See NPL 1 for details on the MBMS interest indication.

In step S13, the eNB 200 transmits, to the UE 100, an SCell cancellation notification (Deactivation (SCell)) in the cell #1. The SCell cancellation notification is used to cancel the settings of the cell #2 as the SCell. In response to the reception of the SCell cancellation notification, the UE 100 cancels the settings of the cell #2 as the SCell.

In step S14, the eNB 200 transmits, to the UE 100, a reconfiguration message (RRC Connect Reconfiguration) for changing the PCell to the cell #2 in the cell #1. In response to the reception of the reconfiguration message, the UE 100 sets the cell #2 as a new PCell.

In step S15, the UE 100 transmits, to the eNB 200, a message (RRC Connect Reconfiguration Complete) indicating the completion of changes in the settings. As a result, the UE 100 performs communication with the cell #2 as the new PCell.

In step S16, the UE 100 performs blind decoding for the CSS and the USS that are set by the cell #2. Further, the UE 100 receives the system information (the SIB 13) from the cell #2 on the basis of the result of the blind decoding for the CSS. As a result, the UE 100 can receive the MBMS control information and the MBMS data transmitted by the cell #2. It is noted that at this point of time, the cell #1 does not perform communication with the UE 100. Thus, a process for adding the cell #1 as the SCell may be performed to resume the carrier aggregation.

Modification of First Embodiment

The above-described communication control method according to the first embodiment can be applied to a dual connectivity scheme (Dual Connectivity).

(1) Dual Connectivity Scheme

The dual connectivity scheme is expected to be introduced in Release 12 and thereafter. In the dual connectivity scheme, a radio resource is allocated to the UE 100 from a plurality of eNBs 200, and thus, an improvement in throughput is expected. It is noted that the dual connectivity scheme may be called a carrier aggregation between eNBs 200 (inter-eNB CA).

Figure 11:
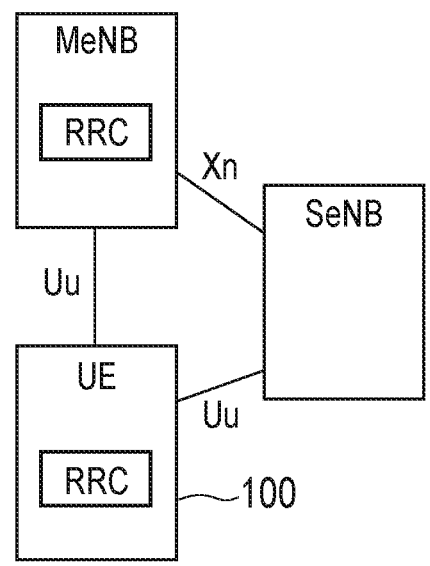
FIG. 11 is a diagram showing a dual connectivity scheme according to a modification of the first embodiment.

FIG. 11 is a diagram for describing an overview of a dual connectivity scheme.

As shown in FIG. 11, in the dual connectivity scheme, only a master eNB (an MeNB) establishes an RRC connection with the UE 100. On the other hand, a secondary eNB (SeNB) provides an additional radio resource to the UE 100 without establishing an RRC connection with the UE 100. In other words, the MeNB establishes not only a user plane connection, but also a control plane connection with the UE 100. On the other hand, the SeNB establishes a user plane connection with the UE 100, without establishing a control plane connection with the UE 100. An Xn interface is set between the MeNB and the SeNB. The Xn interface is either an X2 interface or a new interface.

In the dual connectivity scheme, the UE 100 is capable of carrier aggregation using N number of cells managed by the MeNB and M number of cells managed by the SeNB, simultaneously. In the dual connectivity scheme, the maximum number serving cells of the UE 100, in other words, the maximum number of (N+M) is five, for example. Here, a group composed of N number of cells managed by the MeNB is called a master cell group (MCG). Moreover, a group composed of M number of cells managed by the SeNB is called a secondary cell group (SCG). In the SCG, a special cell provided with PUCCH of the UE 100 is set. The special cell performs some of the functions of a primary cell (PCell) in carrier aggregation.

(2) Operation According to a Modification of First Embodiment

Figure 12:
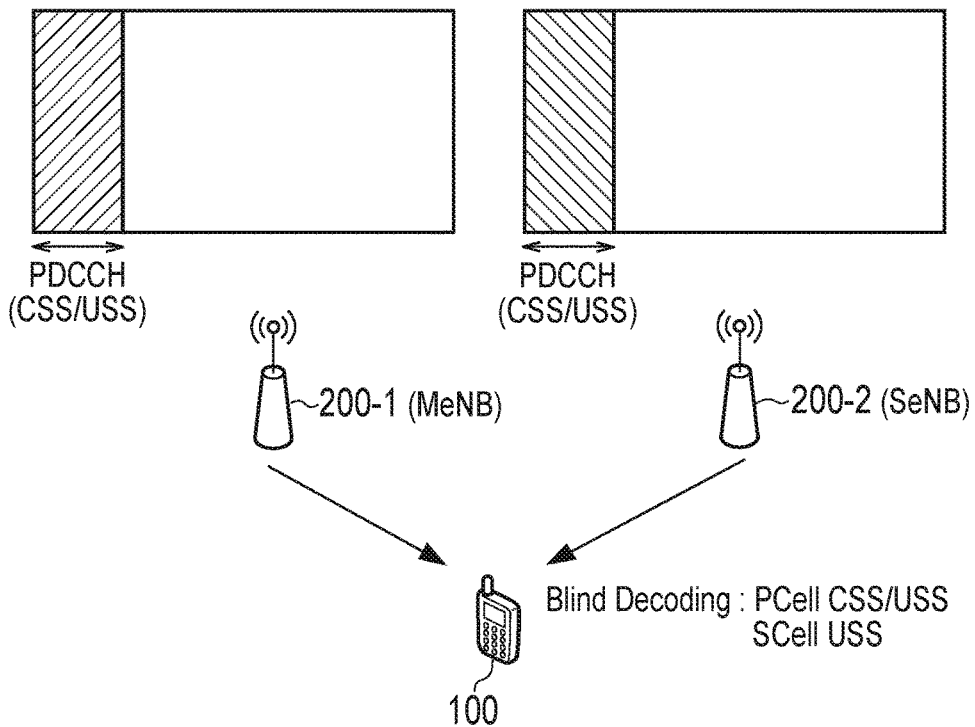
FIG. 12 is a diagram showing an operation environment according to a modification of the first embodiment.

FIG. 12 is a diagram showing an operation environment according to a modification of the first embodiment.

As shown in FIG. 12, in the dual connectivity scheme, the UE 100 simultaneously performs communication with a plurality of cells managed by a plurality of eNBs 200. In FIG. 12, the eNB 200-1 is set as the MeNB, and the eNB 200-2 is set as the SeNB. In the modification of the first embodiment, the PCell included in the MCG managed by the eNB 200-1 corresponds to the main cell, and the cell managed by the eNB 200-2 corresponds to the subordinate cell.

The downlink subframe of the eNB 200-1 and the downlink subframe of the eNB 200-2 include a control region (a PDCCH region), respectively. The PDCCH region includes a CSS and a USS. In the present modification, the UE 100 performs blind decoding for the USS of the SeNB together with the blind decoding for both the CSS and the USS of the MeNB. Since the UE 100 performs blind decoding for the CSS of the MeNB, the UE 100 is capable of acquiring the system information of the MeNB. On the other hand, since the UE 100 does not perform blind decoding for the CSS of the SeNB, the UE 100 is not capable of acquiring the system information of the SeNB.

Figure 13:
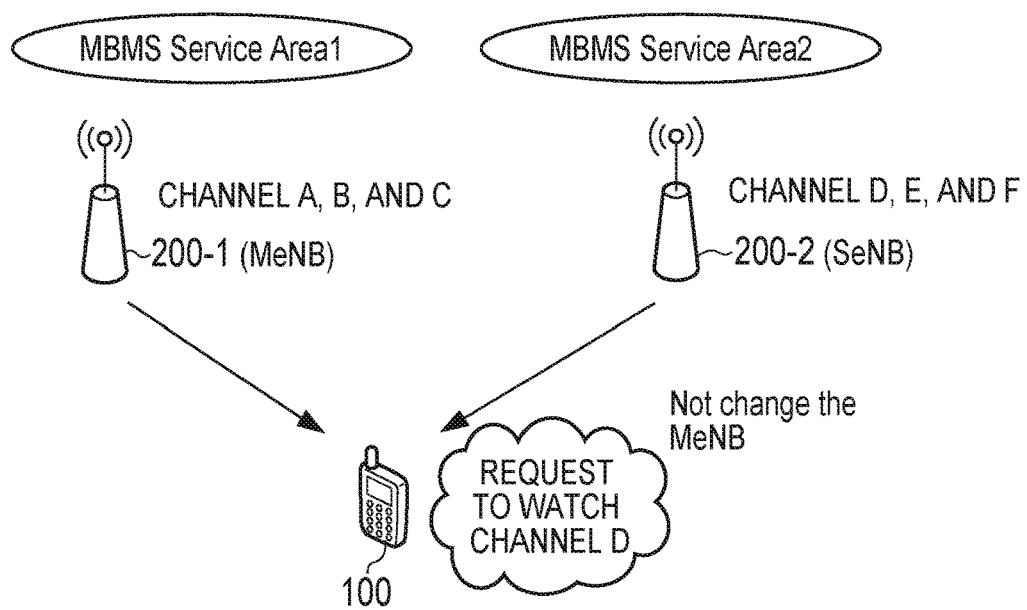
FIG. 13 is a diagram for describing a problem occurring in the operation environment shown in FIG. 12.

FIG. 13 is a diagram for describing a problem occurring in the operation environment shown in FIG. 12.

As shown in FIG. 13, the cell of the eNB 200-1 (the MeNB) belongs to the MBMS service area 1, and the cell of the eNB 200-2 (the SeNB) belongs to the MBMS service area 2. The MBMS service area 1 is an area that provides the MBMS data of channels A, B, and C. The MBMS service area 2 is an area that provides the MBMS data of channels D, E, and F.

The UE 100 understands that the cell of the eNB 200-1 belongs to the MBMS service area 1, and the cell of the eNB 200-2 belongs to the MBMS service area 2 through the system information (the SIB 15: System Information Block type 15) and the like acquired from the eNB 200-1. Further, the UE 100 understands the information related to the channels provided by each MBMS service area through an NAS message.

Here, a case in which the UE 100 has an interest in the MBMS data of channel D is assumed. In the present case, if the UE 100 has an interest in the MBMS data transmitted from the SeNB, the UE 100 is believed to acquire the system information (the SIB 13) of the SeNB, and receive the MBMS control information and the MBMS data from the SeNB.

However, when the UE 100 acquires the system information (the SIB 13) of the SeNB, the UE 100 is required to perform blind decoding for the CSS set by the SeNB. Therefore, the UE 100 performs blind decoding for the CSS for the SeNB and the MeNB, respectively, which causes an increase in the process load of the UE 100 owing to blind decoding.

Therefore, in the modification according to the first embodiment, the process load of the UE 100 owing to blind decoding is reduced by changing the MeNB from the eNB 200-1 to the eNB 200-2 by a method similar to the above-described first embodiment.

Figure 14:
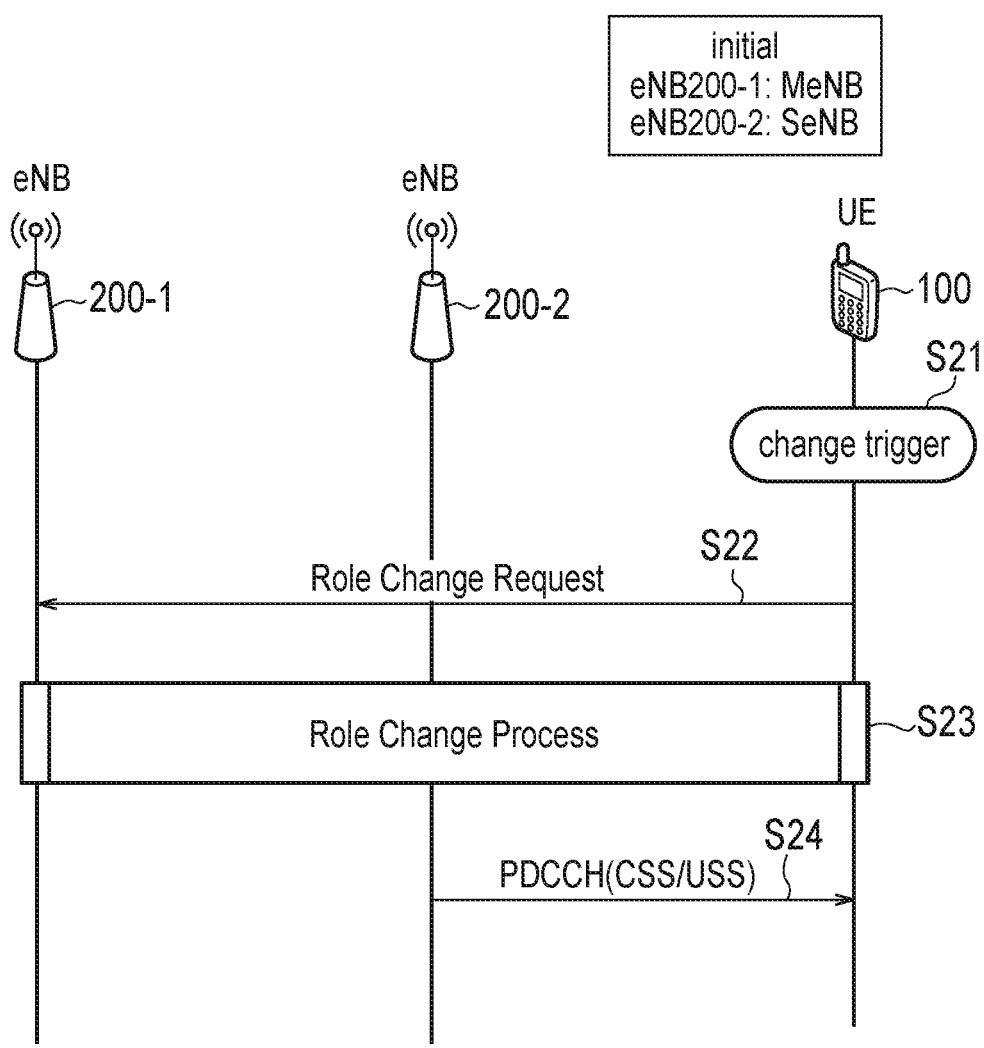
FIG. 14 is a sequence diagram showing an operation according to a modification of the first embodiment.

FIG. 14 is a sequence diagram showing an operation according to the modification of the first embodiment. In the initial state, the eNB 200-1 is set as the MeNB of the UE 100, and the eNB 200-2 is set as the SeNB of the UE 100.

As shown in FIG. 14, in step S21, the UE 100 determines that the MeNB is to be changed from the eNB 200-1 to the eNB 200-2. For example, if the UE 100 has an interest in receiving the MBMS data that is transmitted from the cell of the eNB 200-2 by multicast, the UE 100 determines that the MeNB is to be changed from the cell of the eNB 200-1 to the cell of the eNB 200-2. Alternatively, if the UE 100 has an interest in receiving the MBMS data that is transmitted from the cell of the eNB 200-2 by multicast, and does not have an interest in receiving the MBMS data that is transmitted from the cell of the eNB 200-1 by multicast, the UE 100 determines that the MeNB is to be changed from the eNB 200-1 to the eNB 200-2.

In step S22, the UE 100 transmits an MeNB change request (a Role Change request) to the eNB 200-1. The MeNB change request may be included in an MBMS interest indication. Alternatively, the MeNB change request may be a message that is different from the MBMS interest indication. In this case, it may be specified that the transmission of the MeNB change request is allowed only after the transmission of the MBMS interest indication.

In step S23, an MeNB change process (a Role Change Process) is performed. The details of the MeNB change process will be described later. The UE 100 performs communication by assuming the eNB 200-2 as the new MeNB.

In step S24, the UE 100 performs blind decoding for the CSS and the USS that are set by the eNB 200-2. Further, the UE 100 receives the system information (the SIB 13) from the cell of the eNB 200-2 on the basis of the result of the blind decoding for the CSS. As a result, the UE 100 can receive the MBMS control information and the MBMS data transmitted by the cell of the eNB 200-2. It is noted that at this point of time, the eNB 200-1 does not perform communication with the UE 100. Thus, a process for adding the eNB 200-1 as the SeNB may be performed to resume dual connectivity.

Figure 15:
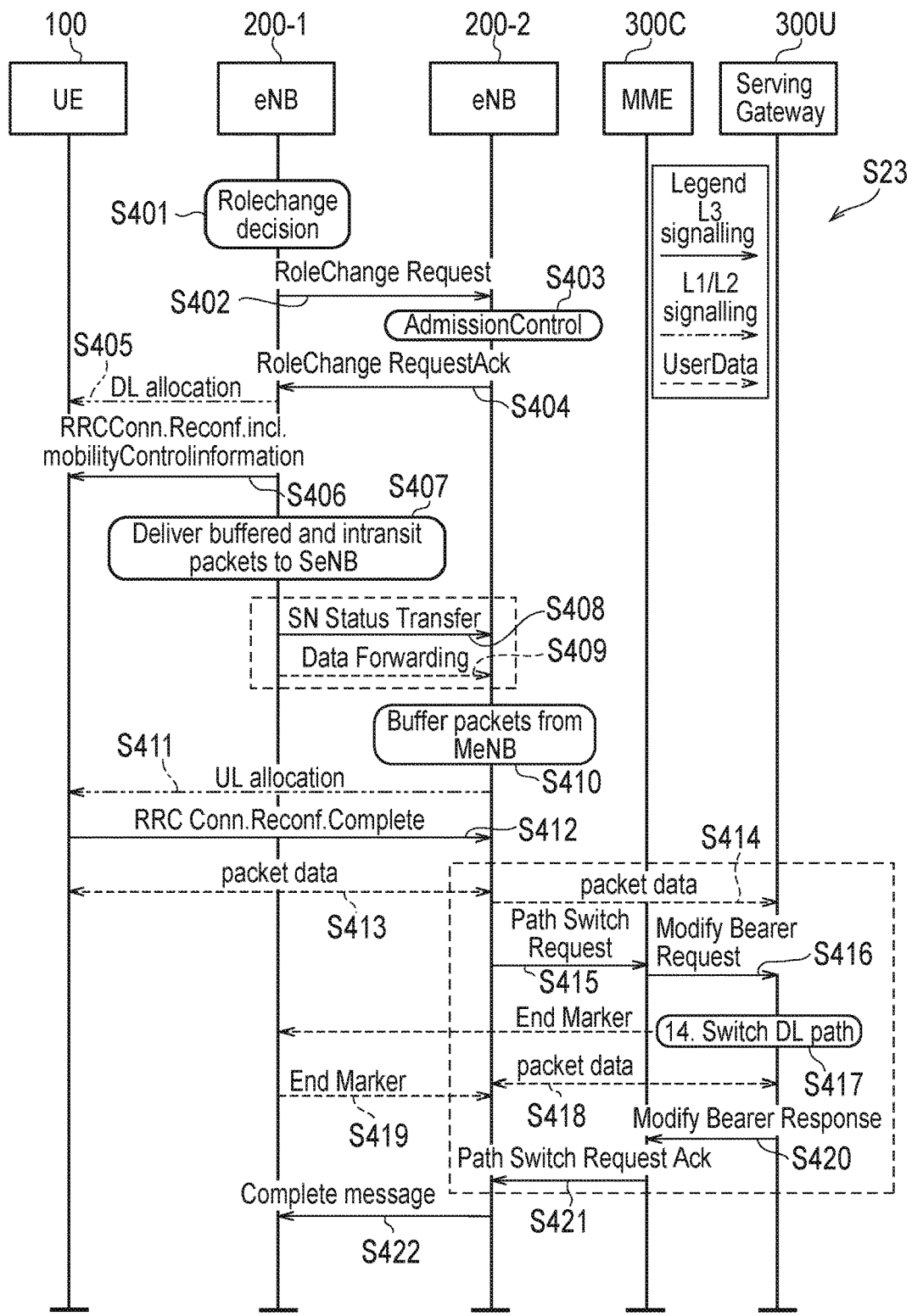
FIG. 15 is a sequence diagram showing an MeNB change process (step S23 of FIG. 14).

FIG. 15 is a sequence diagram showing an MeNB change process (step S23 of FIG. 14).

As shown in FIG. 15, in step S401, the eNB 200-1 decides to perform a change of the MeNB to the eNB 200-2 on the basis of the MeNB change request (the Role Change request).

In step S402, the eNB 200-1 transmits, to the eNB 200-2, a change request (a Role Change Request) requesting a change in the MeNB. A switching request may include the RRC information (RRC Container, Context) related to the UE 100.

In step S403, the eNB 200-2 having received the change request (the Role Change Request) decides whether or not to approve the change request. The eNB 200-2 takes the decision in consideration of the load status of the eNB 200-2. Here, a description will be provided on the assumption that it is decided that the change request is approved.

In step S404, the eNB 200-2 transmits, to the eNB 200-1, an acknowledgment (Role Change Request Ack) for the change request.

In steps S405 and S406, the eNB 200-1 transmits, to the UE 100, a reconfiguration message (RRC Conn. Reconf.) message for performing a change of the MeNB.

In steps S407 through S410, the eNB 200-1 transfers, to the eNB 200-1, the user data of the UE 100 that is accumulated in the eNB 200-2.

In step S411, the eNB 200-2 assigns an uplink radio resource to the UE 100.

In step S412, the UE 100 uses the assigned uplink radio resource to transmit a reconfiguration completion message (RRC Conn. Reconf. Complete) to the eNB 200-2. Thus, the UE 100 sets the eNB 200-2 as the MeNB. In other words, the MeNB switches from the eNB 200-1 to the eNB 200-2.

Here, since an identifier (C-RNTI: Cell Radio Network Temporary Identity) has already been assigned to the UE 100 from the eNB 200-2, and the uplink timing adjustment (TA: Timing Advance) is also complete, the UE 100 transmits a reconfiguration completion message to the eNB 200-2 without performing the random access procedure to the eNB 200-2.

In step S413, the UE 100 transmits and receives user data to and from the eNB 200-1.

In steps S414 through S421, the data path with the S-GW 300U is switched from the eNB 200-1 to the eNB 200-2. More particularly, data path switching is requested from the eNB 200-2 through the MME 300C, and the S-GW 300U switches the data path from the eNB 200-1 to the eNB 200-2.

In step S422, the eNB 200-1 transmits an MeNB change completion message to the eNB 200-2.

Second Embodiment

In a second embodiment, a difference from the first embodiment will be mainly described. The second embodiment is similar to the first embodiment in regard to the system configuration.

Similar to the first embodiment, the second embodiment describes an operation related to MBMS reception during the application of carrier aggregation. The operation environment of the second embodiment is similar to that of the first embodiment (see FIG. 8 and FIG. 9). In other words, the UE 100 simultaneously performs communication with the cell #1 that operates as the PCell, and communication with the cell #2 that operates as the SCell. Further, the cell #1 belongs to an MBMS service area 1, and the cell #2 belongs to an MBMS service area 2.

In the second embodiment, the process load of the UE 100 owing to blind decoding is reduced by the method described below.

The communication control method according to the second embodiment includes a step A of simultaneously performing, by the UE 100, communication with a cell #1 that operates as a PCell, and communication with a cell #2 that operates as an SCell; a step B of transmitting, by the cell #1, to the UE 100, first information that is necessary for the reception of the MBMS control information from the cell #1 through the system information (the SIB 13); and a step C of transmitting, by the cell #1, to the UE 100, second information that is necessary for the reception of the MBMS control information from the cell #2.

As a result, the UE 100 can receive the MBMS control information transmitted by the cell #2 on the basis of the second information from the cell #1. Thus, blind decoding for the CSS is not necessary for the cell #2, which is the SCell. Therefore, the process load owing to blind decoding can be reduced to half as compared to the case when blind decoding is performed in parallel for two cells.

(1) Operation Pattern 1

In operation pattern 1, the cell #1 broadcasts the second information through the system information (the SIB 13), in the step C.

Figure 16:
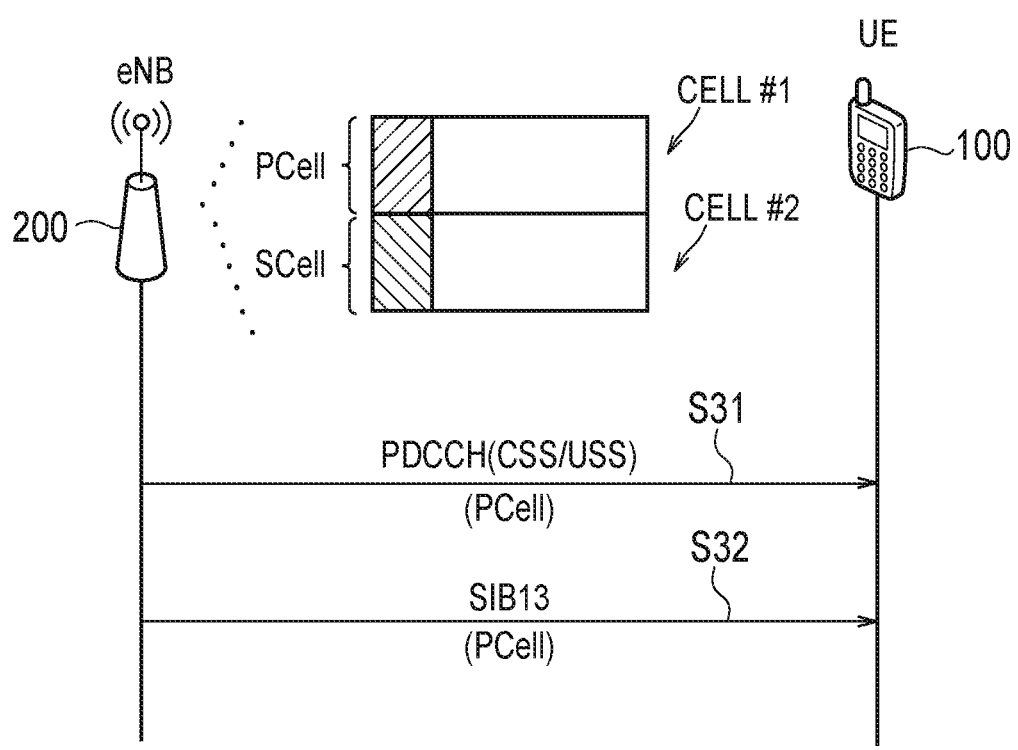
FIG. 16 is a sequence diagram showing an operation pattern 1 according to the second embodiment.

FIG. 16 is a sequence diagram showing the operation pattern 1 according to the second embodiment. In the initial state, the cell #1 is set as the PCell of the UE 100, and the cell #2 is set as the SCell of the UE 100.

As shown in FIG. 16, in step S31, the eNB 200 transmits the control information to the UE 100 through the PDCCH (the CSS and the USS) of the cell #1 (the PCell). The UE 100 performs blind decoding for the PDCCH (the CSS and the USS) of the cell #1. The UE 100 changes to a state in which the UE 100 can receive the system information (the SIB 13) of the cell #1 on the basis of the information included in the CSS.

In step S32, the eNB 200 transmits the system information (the SIB 13) of the cell #1. In the operation pattern 1, in addition to the first information that is necessary for the reception of the MBMS control information from the cell #1, the system information (the SIB 13) of the cell #1 includes the second information that is necessary for the reception of the MBMS control information from the cell #2. The UE 100 receives the system information (the SIB 13) of the cell #1.

FIG. 17 is a diagram showing the system information (the SIB 13) in the operation pattern 1.

As shown in FIG. 17, similar to a general SIB 13, the system information (the SIB 13) of the cell #1 includes the first information that is necessary for the reception of the MBMS control information from the cell #1. The system information (the SIB 13) of the cell #1 is different from a general SIB 13 in regard to the point that the system information of the cell #1 includes the second information E1 that is necessary for the reception of the MBMS control information from the cell #2. The second information E1 is information related to the MCCH of the cell #2.

(2) Operation Pattern 2

In the operation pattern 2 according to the second embodiment, the cell #1 (the eNB 200) unicasts the second information E1 to the UE 100 through individual signaling that is different from the system information (the SIB 13), in the step C. The individual signaling is, for example, an RRC message of an individual UE. In the operation pattern 2, the three methods described below are the triggers of unicast transmission of the second information E1.

In the first method, the UE 100 transmits, to the cell #1, terminal capability information (UE Capability) related to the capability of reception of the MBMS that is delivered by the secondary cell (the subordinate cell). In the step C, the cell #1 (eNB 200) unicasts the second information to the UE 100 through individual signaling on the basis of the terminal capability information from the UE 100. In other words, unicast transmission of the second information is performed to the UE 100 that is capable of receiving the MBMS delivered by the secondary cell, through individual signaling.

In the second method, the UE 100 transmits, to the cell #1, an MBMS interest indication that indicates that the UE 100 has an interest in receiving the MBMS data transmitted from the cell #2. In the step C, the cell #1 (the eNB 200) unicasts the second information to the UE 100 through individual signaling in response to the reception of MBMS interest indication from the UE 100.

The third method is a combination of the first method and the second method. The cell #1 (the eNB 200) unicasts the second information to the UE 100 through individual signaling in response to the reception of both the terminal capability information and the MBMS interest indication from the UE 100.

Modification of Second Embodiment

The above-described communication control method according to the second embodiment can be applied to a dual connectivity scheme (Dual Connectivity).

Similar to the modification of the first embodiment, the modification of the second embodiment describes an operation related to MBMS reception during the application of dual connectivity. The operation environment of the modification of the second embodiment is similar to that of the modification of the first embodiment (see FIG. 12 and FIG. 13). In other words, the UE 100 simultaneously performs communication with the eNB 200-1 that operates as the MeNB, and communication with the eNB 200-2 that operates as the SeNB. Further, the cell of the eNB 200-1 belongs to an MBMS service area 1, and the cell of the eNB 200-2 belongs to an MBMS service area 2.

In the modification of the second embodiment, same as the second embodiment described above, the eNB 200-1 transmits, to the UE 100, the first information that is necessary for the reception of the MBMS control information from the cell of the eNB 200-1 through the system information (the SIB 13). Further, the eNB 200-1 transmits, to the UE 100, the second information that is necessary for the reception of the MBMS control information from the cell of the eNB 200-2, by broadcast or unicast. Other points are the same as those of the second embodiment.

Third Embodiment

A third embodiment will be described while focusing on the differences from the first embodiment and the second embodiment. The third embodiment is similar to the first embodiment in regard to the system configuration.

Similar to the first embodiment and the second embodiment, the third embodiment describes an operation related to MBMS reception during the application of carrier aggregation. Further, in the third embodiment, same as the first embodiment and the second embodiment, each of a plurality of cell sets a CSS that is applied in common to all UEs 100 within the corresponding cell.

Figure 18:
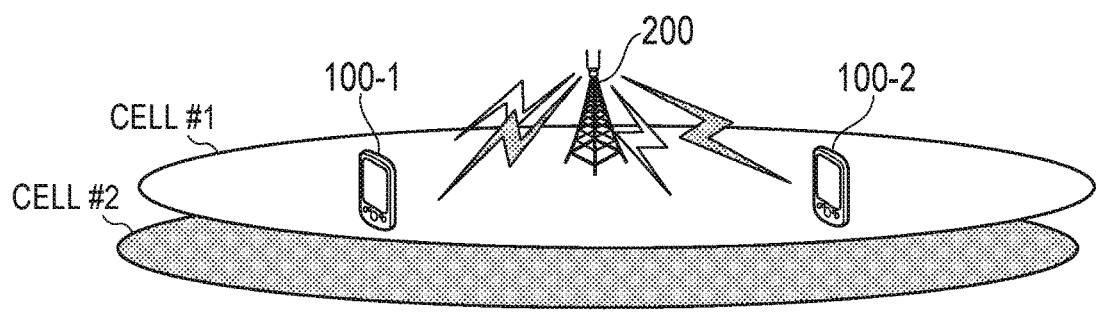
FIG. 18 is a diagram showing an operation environment according to the third embodiment.

FIG. 18 is a diagram showing an operation environment according to the third embodiment.

As shown in FIG. 18, the eNB 200 manages a cell #1 and a cell #2. The cell #1 and the cell #2 use different frequencies (component carriers). The UE 100 is capable of carrier aggregation by which communication with the cell #1 and communication with the cell #2 is performed simultaneously. However, the UE 100 may perform only the communication with the cell #1 or the communication with the cell #2 without applying carrier aggregation.

Figure 19A:
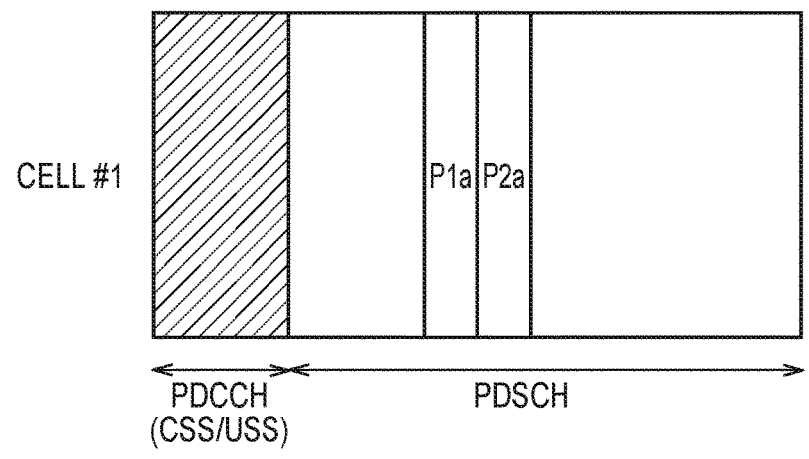
FIGS. 19A and 19B are diagrams showing a communication control method according to the third embodiment.
Figure 19B:
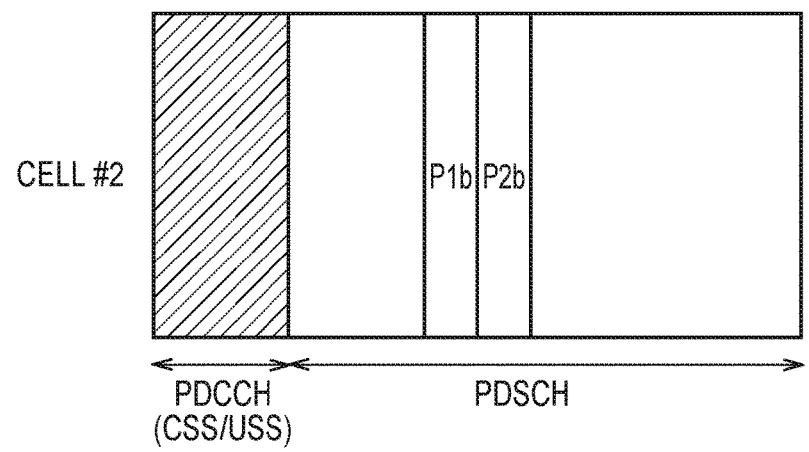

FIGS. 19A and 19B are diagrams showing a communication control method according to the third embodiment.

As shown in FIGS. 19A and 19B, the communication control method according to the third embodiment includes a step A of arranging, by a cell #1, in a CSS of the cell #1, information indicating a resource location of a first radio resource for transmitting first MBMS data (P1a, P2a) in the cell #1; and a step B of arranging, by a cell #2, in a CSS of the cell #2, information indicating a resource location of a second radio resource for transmitting second MBMS data (P1b, P2b) in the cell #2.

Here, the first MBMS data and the second MBMS data are generated on the basis of the same information source. For example, the information source is video data. The first MBMS data consists of some video frames configuring the information source. The second MBMS data consists of the other video frames configuring the information source. Alternatively, the first MBMS data is some video portions in a video frame configuring the information source. The second MBMS data consists of the other video portions in a video frame configuring the information source.

Thus, a UE 100 that simultaneously performs communication with the cell #1 and communication with the cell #2 is capable of receiving and playing back the complete video data. On the other hand, a UE 100 that performs only the communication with the cell #1 or the communication with the cell #2 is capable of receiving and playing back the video data despite the fact that the video quality drops.

In the cell #1, the first radio resource for transmitting the first MBMS data (P1a, P2a) is provided in the PDSCH region. In the cell #2, the second radio resource for transmitting the second MBMS data (P1b, P2b) is provided in the PDSCH region. Here, the first radio resource and the second radio resource are set in the same resource location. The same resource location implies that the location of the resource elements in the subframe is the same. Further, the same MCS is preferably applied to the first MBMS data and the second MBMS data.

The UE 100 that simultaneously performs communication with the cell #1 and communication with the cell #2 not only receives the first MBMS data from the cell #1, but also receives the second MBMS data from the cell #2 on the basis of the result of blind decoding for the CSS of the cell #1. In other words, since the first radio resource and the second radio resource have been set at the same resource location, the UE 100 is capable of designating both the first radio resource and the second radio resource by performing blind decoding for the CSS of the cell #1. Thus, it is possible to do away with the need for blind decoding for the CSS of the cell #2, because of which the process load owing to blind decoding can be reduced. The UE 100 that performs only the communication with the cell #1 receives the first MBMS data from the cell #1 on the basis of the result of blind decoding for the CSS of the cell #1.

A configuration method of the first MBMS data and the second MBMS data will be described next. FIGS. 20A to 20D are diagrams showing a configuration method 1 of the first MBMS data and the second MBMS data.

Figure 20A:
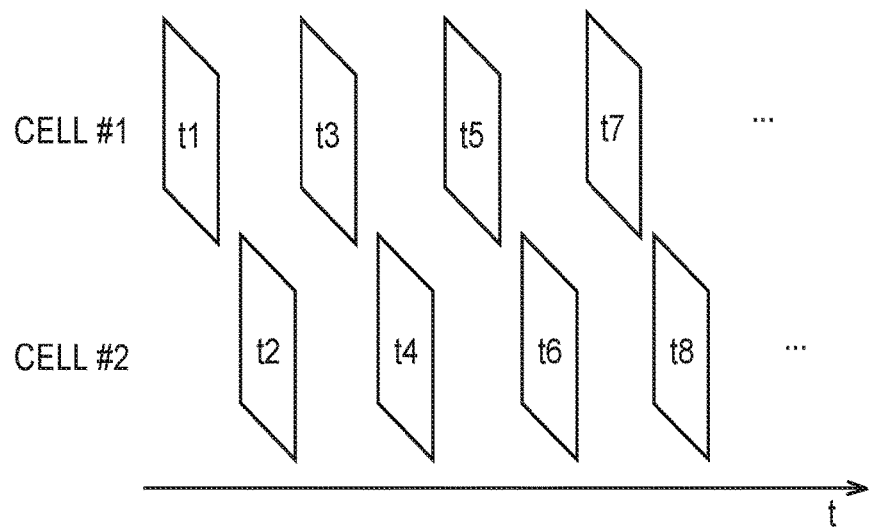
FIGS. 20A to 20D are diagrams showing a configuration method 1 of first MBMS data and second MBMS data according to the third embodiment.

As shown in FIG. 20A, the first MBMS data that is transmitted in the cell #1 consists of some video frames configuring the information source. In FIG. 20A, a case of transmission of video frames of time t1, t3, t5, t7, . . . , t (2n+1), in other words, the odd-numbered frames, in the cell #1 is illustrated. The second MBMS data that is transmitted in the cell #2 consists of the other video frames configuring the information source. In FIG. 20A, a case of transmission of video frames of time t2, t4, t6, t8, . . . , t2n, in other words, the even-numbered frames, in the cell #2 is illustrated.

Figure 20B:
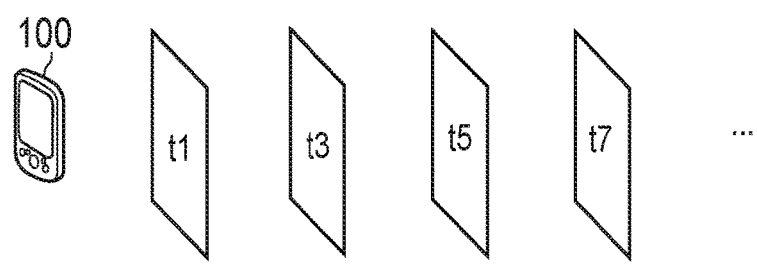

As shown in FIG. 20B, the UE 100 that performs only the communication with the cell #1 receives the first MBMS data from the cell #1 on the basis of the result of blind decoding for the CSS of the cell #1. Thus, it is possible to play back a video consisting of the odd-numbered frames.

Figure 20C:
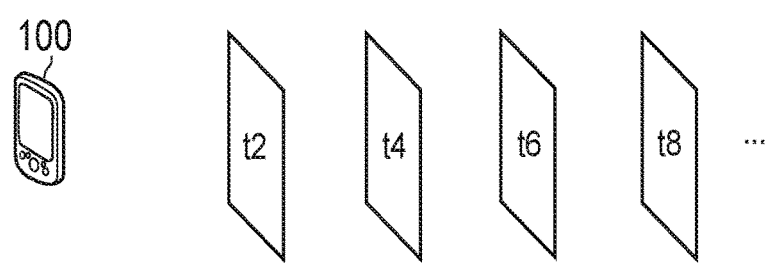

As shown in FIG. 20C, the UE 100 that performs only the communication with the cell #2 receives the second MBMS data from the cell #2 on the basis of the result of blind decoding for the CSS of the cell #2. Thus, it is possible to play back a video consisting of the even-numbered frames.

Figure 20D:
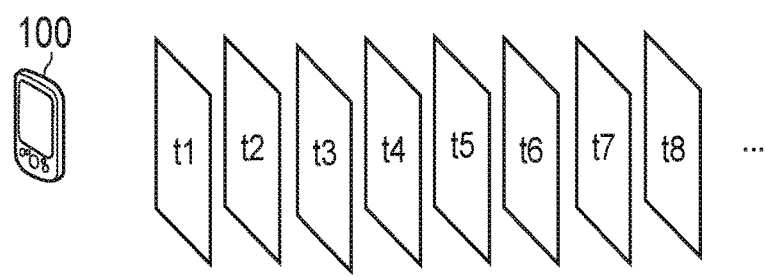

As shown in FIG. 20D, the UE 100 that simultaneously performs communication with the cell #1 and communication with the cell #2 receives the first MBMS data from the cell #1, and also receives the second MBMS data from the cell #2 on the basis of the result of blind decoding for the CSS of the cell #1 (or the cell #2). Thus, it is possible to play back the complete video.

FIGS. 21A to 21D are diagrams showing a configuration method 2 of the first MBMS data and the second MBMS data.

As shown in FIG. 21A, the first MBMS data that is transmitted in the cell #1 is some video portions in a video line configuring the information source. In FIG. 21A, a case of transmission of odd-numbered lines of the video line in the cell #1 is illustrated. The second MBMS data that is transmitted in the cell #2 consists of the other video portions in the video line configuring the information source. In FIG. 21A, a case of transmission of odd-numbered lines of the video line in the cell #2 is illustrated.

As shown in FIG. 21B, the UE 100 that performs only the communication with the cell #1 receives the first MBMS data from the cell #1 on the basis of the result of blind decoding for the CSS of the cell #1. Thus, it is possible to play back a video consisting of the odd-numbered lines. It is noted that an even-numbered line may be compensated from an odd-numbered line.

As shown in FIG. 21C, the UE 100 that performs only the communication with the cell #2 receives the second MBMS data from the cell #2 on the basis of the result of blind decoding for the CSS of the cell #2. Thus, it is possible to play back a video consisting of the even-numbered lines. It is noted that an odd-numbered line may be compensated from an even-numbered line.

As shown in FIG. 21D, the UE 100 that simultaneously performs communication with the cell #1 and communication with the cell #2 receives the first MBMS data from the cell #1, and also receives the second MBMS data from the cell #2 on the basis of the result of blind decoding for the CSS of the cell #1 (or the cell #2). Thus, it is possible to play back the complete video.

Figure 22:
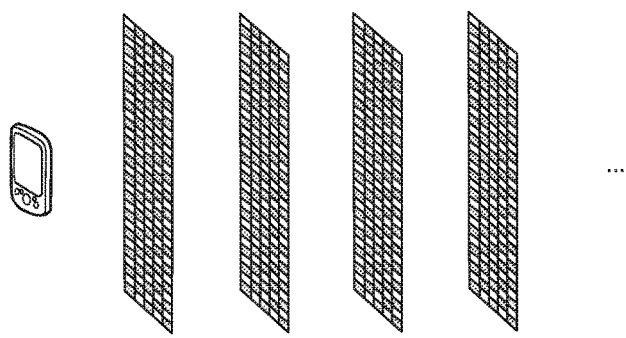
FIG. 22 is a diagram showing a modification of the configuration method 2 of the first MBMS data and the second MBMS data according to the third embodiment.

FIG. 22 is a diagram showing a modification of the configuration method 2 of the first MBMS data and the second MBMS data. In the above-described configuration method 2, a video frame was divided into an odd-numbered line and an even-numbered line, but as shown in FIG. 22, a video frame may be divided in the form of a matrix, and some portions of the matrix may be transmitted in the cell #1, while the other portions may be transmitted in the cell #2.

FIGS. 23A to 23D are diagrams showing a configuration method 3 of the first MBMS data and the second MBMS data. In the configuration method 3, a stereoscopic video is handled as the information source. The stereoscopic video consists of a left-eye video frame and a right-eye video frame.

Figure 23A:
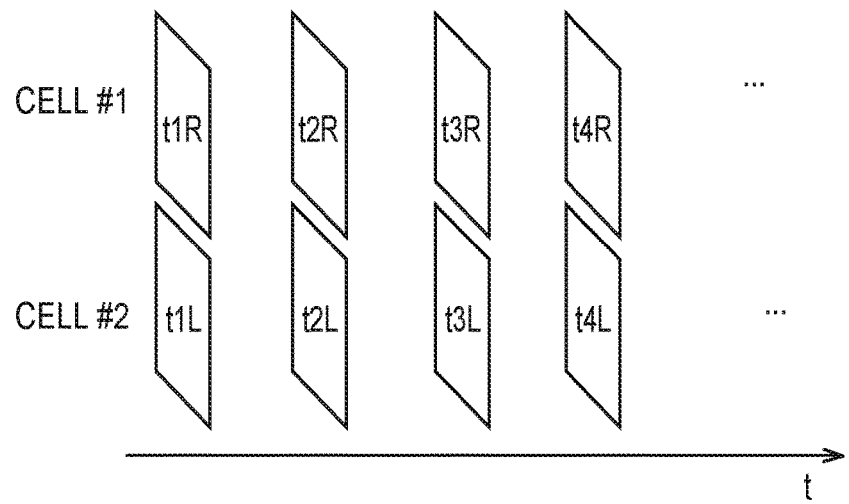
FIGS. 23A to 23D are diagrams showing a configuration method 3 of the first MBMS data and the second MBMS data according to the third embodiment.

As shown in FIG. 23A, the first MBMS data that is transmitted in the cell #1 consists of some video frames configuring the information source. In FIG. 23A, a case of transmission of a right-eye video frame in the cell #1 is illustrated. The second MBMS data that is transmitted in the cell #2 consists of the other video frames configuring the information source. In FIG. 23A, a case of transmission of a left-eye video frame in the cell #2 is illustrated.

Figure 23B:
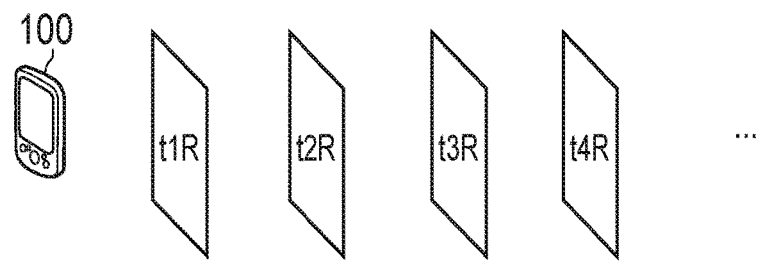

As shown in FIG. 23B, the UE 100 that performs only the communication with the cell #1 receives the first MBMS data from the cell #1 on the basis of the result of blind decoding for the CSS of the cell #1. Thus, it is possible to play back a video consisting of the right-eye video frames.

Figure 23C:
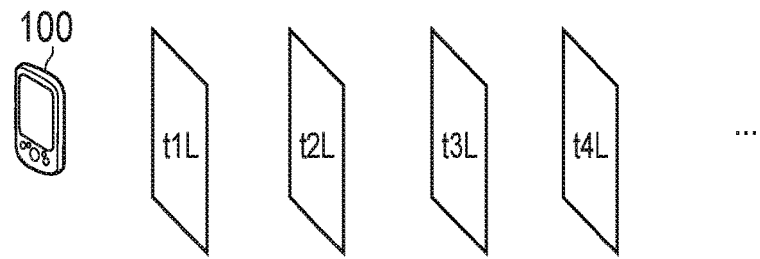

As shown in FIG. 23C, the UE 100 that performs only the communication with the cell #2 receives the second MBMS data from the cell #2 on the basis of the result of blind decoding for the CSS of the cell #2. Thus, it is possible to play back a video consisting of the left-eye video frames.

Figure 23D:
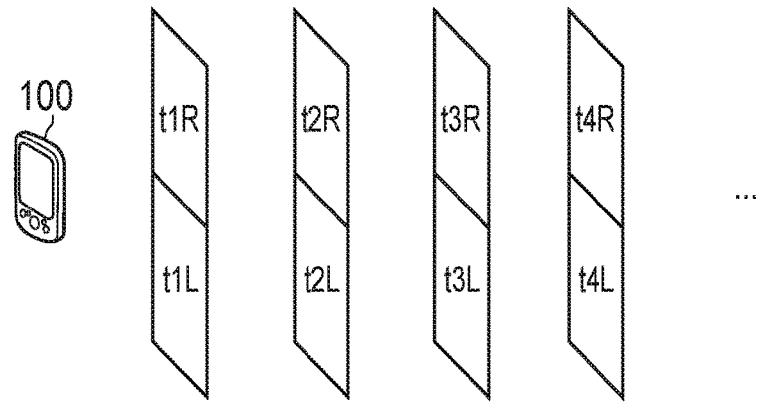

As shown in FIG. 23D, the UE 100 that simultaneously performs communication with the cell #1 and communication with the cell #2 receives the first MBMS data from the cell #1, and also receives the second MBMS data from the cell #2 on the basis of the result of blind decoding for the CSS of the cell #1 (or the cell #2). Thus, it is possible to play back the stereoscopic video.

Next, a method of associating the cell #1 and the cell #2 will be described. The association between the cell #1 and the cell #2 may be specified beforehand.

Alternatively, the association between the cell #1 and the cell #2 may be notified to the UE 100 from the eNB 200 either by broadcast or unicast.

FIG. 24 is a diagram showing a notification method of an association between the cell #1 and the cell #2. As shown in FIG. 24, the eNB 200 includes information E2 related to the MBMS service area 1 to which the cell #1 belongs, and the MBMS service area 2 to which the cell #2 belongs in the system information (the SIB 15: System Information Block type 15) transmitted by the cell #1.

Modification of Third Embodiment

The above-described communication control method according to the third embodiment can be applied to a dual connectivity scheme (Dual Connectivity). In this case, the above-described cell #1 may be read as the cell of the MeNB, and the cell #2 may be read as the cell of the SeNB.

Other Embodiments

In each of the above-described embodiments, the LTE system is described as an example of the mobile communication system; however, the present invention may be applied not only to the LTE system but also to a system other than the LTE system.

The entire content of Japanese Patent Application No. 2014-057929 (filed on Mar. 20, 2014) is incorporated in the present specification by reference.

INDUSTRIAL APPLICABILITY

The present invention is useful in the field of radio communication such as mobile communication.

The invention claimed is:

1. A communication control method, comprising:
   simultaneously performing, by a user terminal, communication with a first cell operating as a main cell, and communication with a second cell operating as a subordinate cell other than the main cell;
   transmitting, by the user terminal, to the first cell, a main cell change request for changing the main cell from the first cell to the second cell;
   performing, by the user terminal, after changing the main cell to the second cell, blind decoding for the common search space that is set by the second cell; and
   receiving, by the user terminal, system information from the second cell on the basis of a result of the blind decoding, wherein
   in the main cell, blind decoding for a common search space is required,
   the common search space is set by each of a plurality of cells, including the first cell and the second sell, so that the common search space is applied in common to all user terminals within a corresponding one of the plurality of cells, and
   information associated with system information that is necessary for reception of multicast/broadcast control information is arranged in the common search space.

2. The communication control method according to claim 1, wherein
   the first cell and the second cell belong to different MBSFN areas, respectively, and
   when the user terminal has an interest in receiving multicast/broadcast data that is transmitted by multicast from the second cell, the user terminal transmits the main cell change request to the first cell.

3. The communication control method according to claim 1, wherein
   the user terminal simultaneously performs communication with the first cell and communication with the second cell through carrier aggregation, the main cell is a primary cell that is managed by a base station, and the subordinate cell is a secondary cell that is managed by the base station.

4. The communication control method according to claim 1, wherein the user terminal simultaneously performs communication with the first cell and communication with the second cell through a dual connectivity scheme, the main cell is a primary cell included in a master cell group that is managed by a base station, and the subordinate cell is a cell that is managed by another base station different from the base station.

5. A user terminal, comprising:

a controller configured to simultaneously perform communication with a first cell operating as a main cell, and communication with a second cell operating as a subordinate cell other than the main cell;

a transmitter configured to transmit, to the first cell, a main cell change request for changing the main cell from the first cell to the second cell, and a receiver, wherein the controller is configured to perform, after changing the main cell to the second cell, blind decoding for the common search space that is set by the second cell, the receiver is configured to receive system information from the second cell on the basis of a result of the blind decoding, in the main cell, blind decoding for a common search space is required, the common search space is set by each of a plurality of cells, including the first cell and the second sell, so that the common search space is applied in common to all user terminals within a corresponding one of the plurality of cells, and information associated with system information that is necessary for reception of multicast/broadcast control information is arranged in the common search space.

* * * * *